United States Patent [19]

Miyamoto et al.

[11] Patent Number: 5,189,458
[45] Date of Patent: Feb. 23, 1993

[54] ELECTRIC ZOOMING CAMERA

[75] Inventors: Hidenori Miyamoto, Kawasaki; Koichi Daitoku, Sagamihara; Kazuyuki Kazami; Toshiyuki Nakamura, both of Tokyo; Yuji Katano, Kawasaki, all of Japan

[73] Assignee: Nikon Corporation, Tokyo, Japan

[21] Appl. No.: 908,877

[22] Filed: Jul. 7, 1992

Related U.S. Application Data

[63] Continuation of Ser. No. 762,083, Sep. 19, 1991, abandoned, which is a continuation of Ser. No. 603,259, Oct. 26, 1990, abandoned, which is a continuation of Ser. No. 428,519, Oct. 30, 1989, abandoned.

[30] Foreign Application Priority Data

Jul. 5, 1988 [JP] Japan .................................. 63-221775
Nov. 2, 1988 [JP] Japan .................................. 63-279025

[51] Int. Cl.⁵ ............................................. G03B 13/00
[52] U.S. Cl. .............................. 354/400; 354/195.12
[58] Field of Search .................. 354/400, 195.12, 402, 354/403; 358/227, 906, 909

[56] References Cited

U.S. PATENT DOCUMENTS 4,896,177 1/1990 Kazami et al. .................... 354/195.1

FOREIGN PATENT DOCUMENTS 53-113527 3/1978 Japan .
58-103273 6/1983 Japan .
63-220118 4/1988 Japan .
63-131112 11/1988 Japan .

Primary Examiner—Michael L. Gellner
Assistant Examiner—David M. Gray
Attorney, Agent, or Firm—Shapiro and Shapiro

[57] ABSTRACT

A camera has an electrically zoomable lens with two modes. In the first mode, the zooming is continued during the continuation of a manual operation. In the second mode, the zooming is conducted to a focal length corresponding to stored information, which corresponds to a focal length arbitrarily selected in the zooming of the first mode. The stored information is retained even when the second mode is released, and the zooming to the focal length corresponding to the stored information is possble when the second mode is set again.

25 Claims, 17 Drawing Sheets

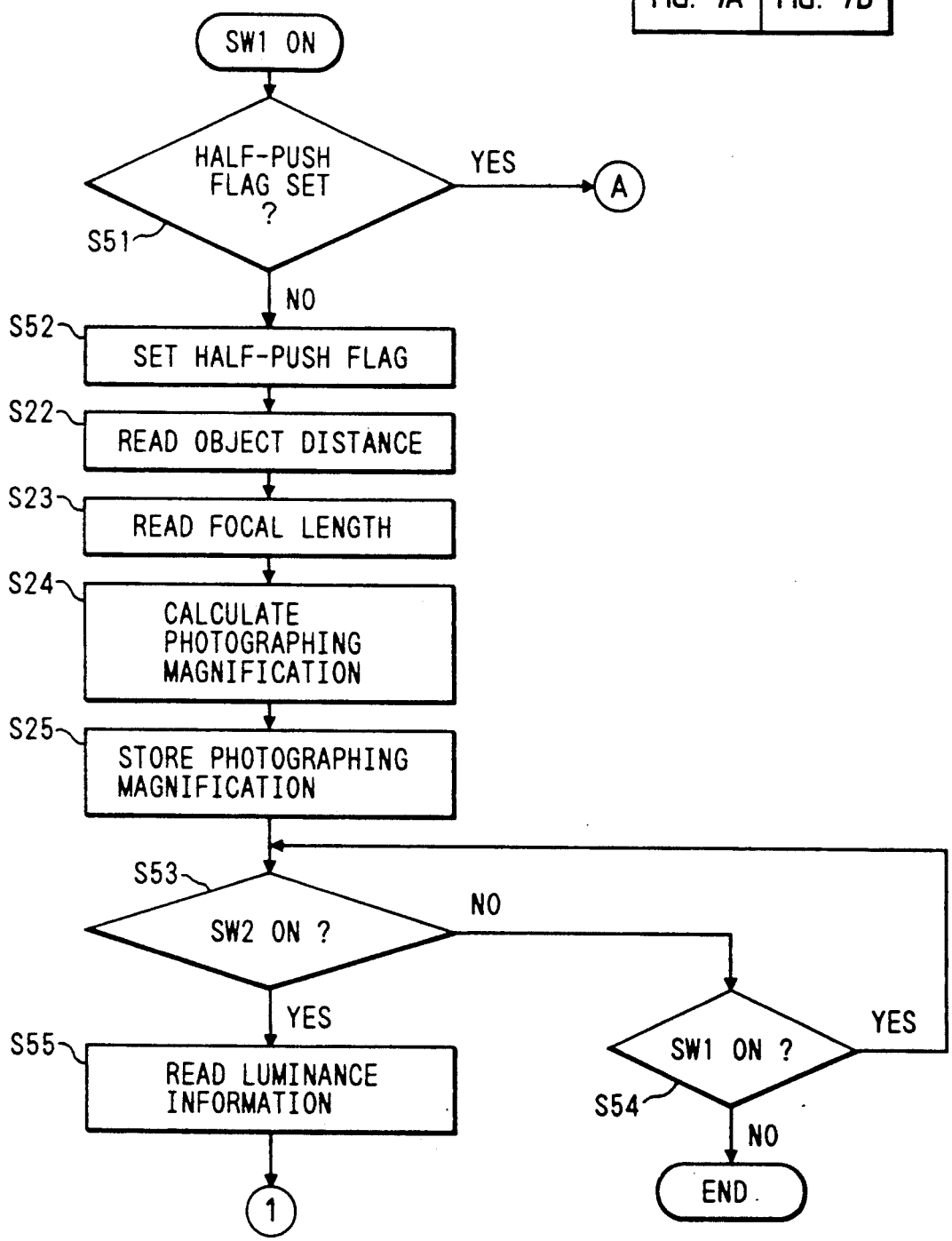

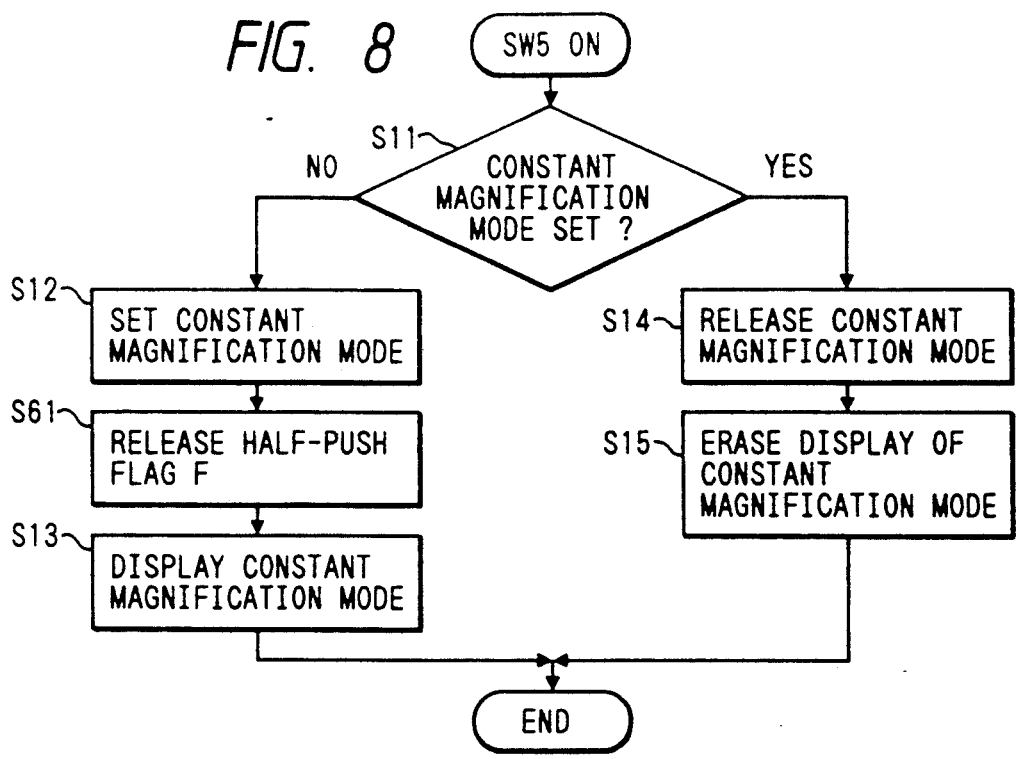
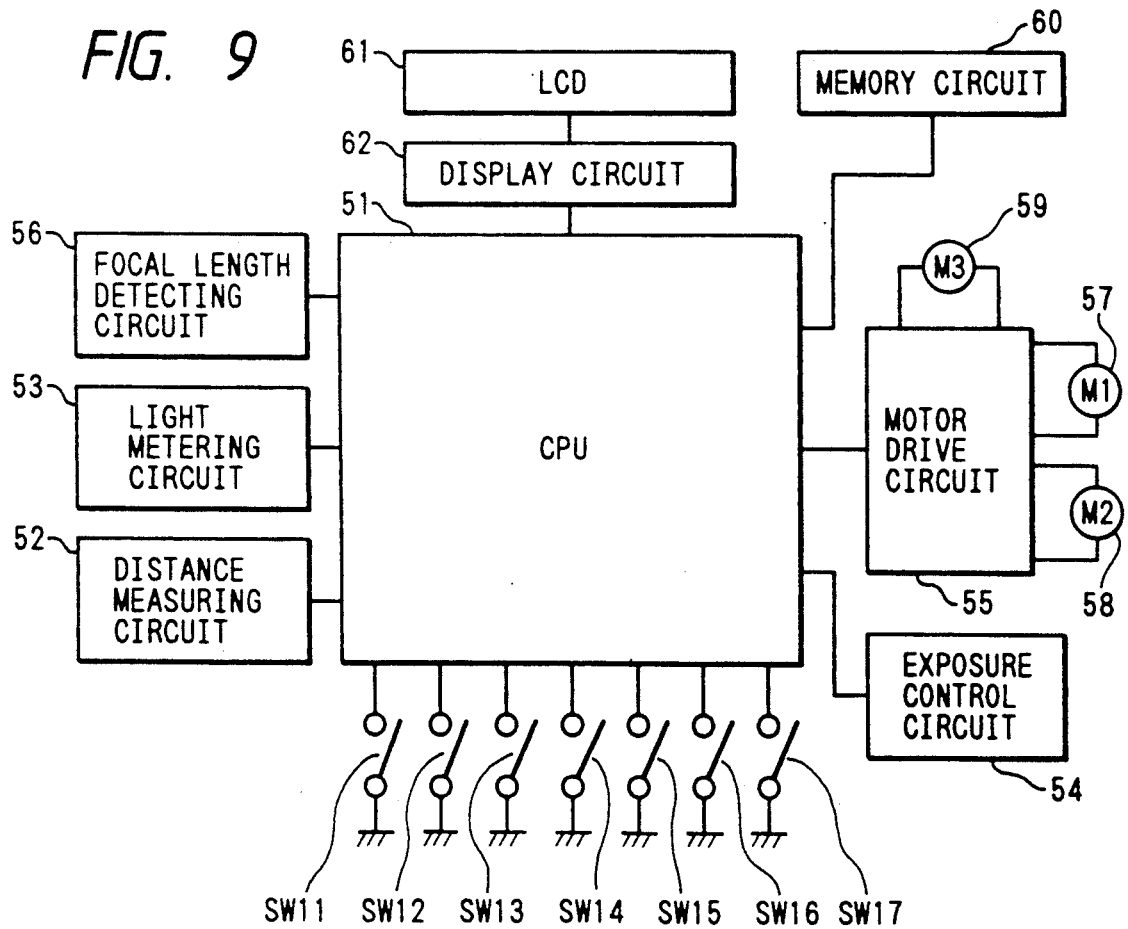

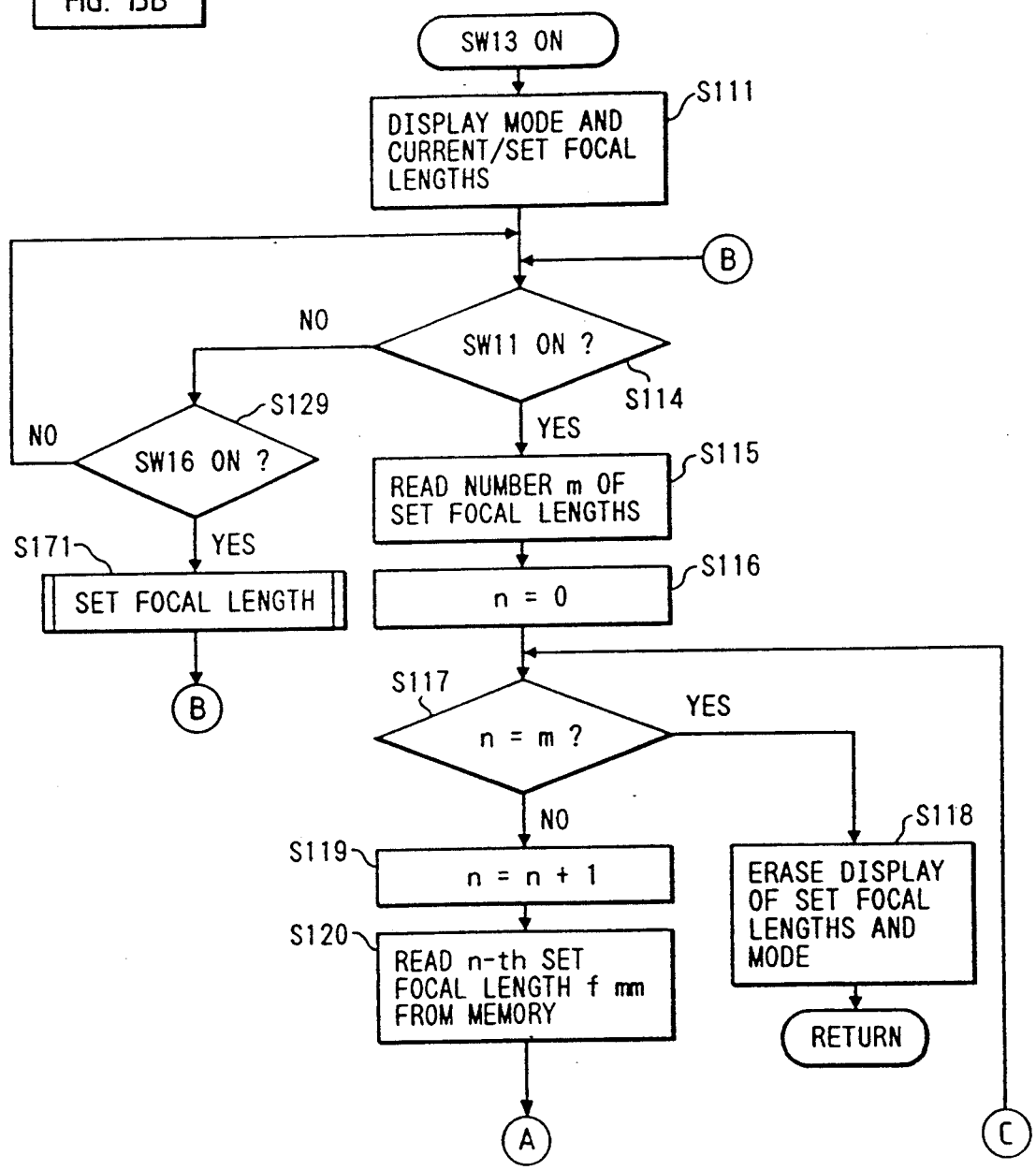

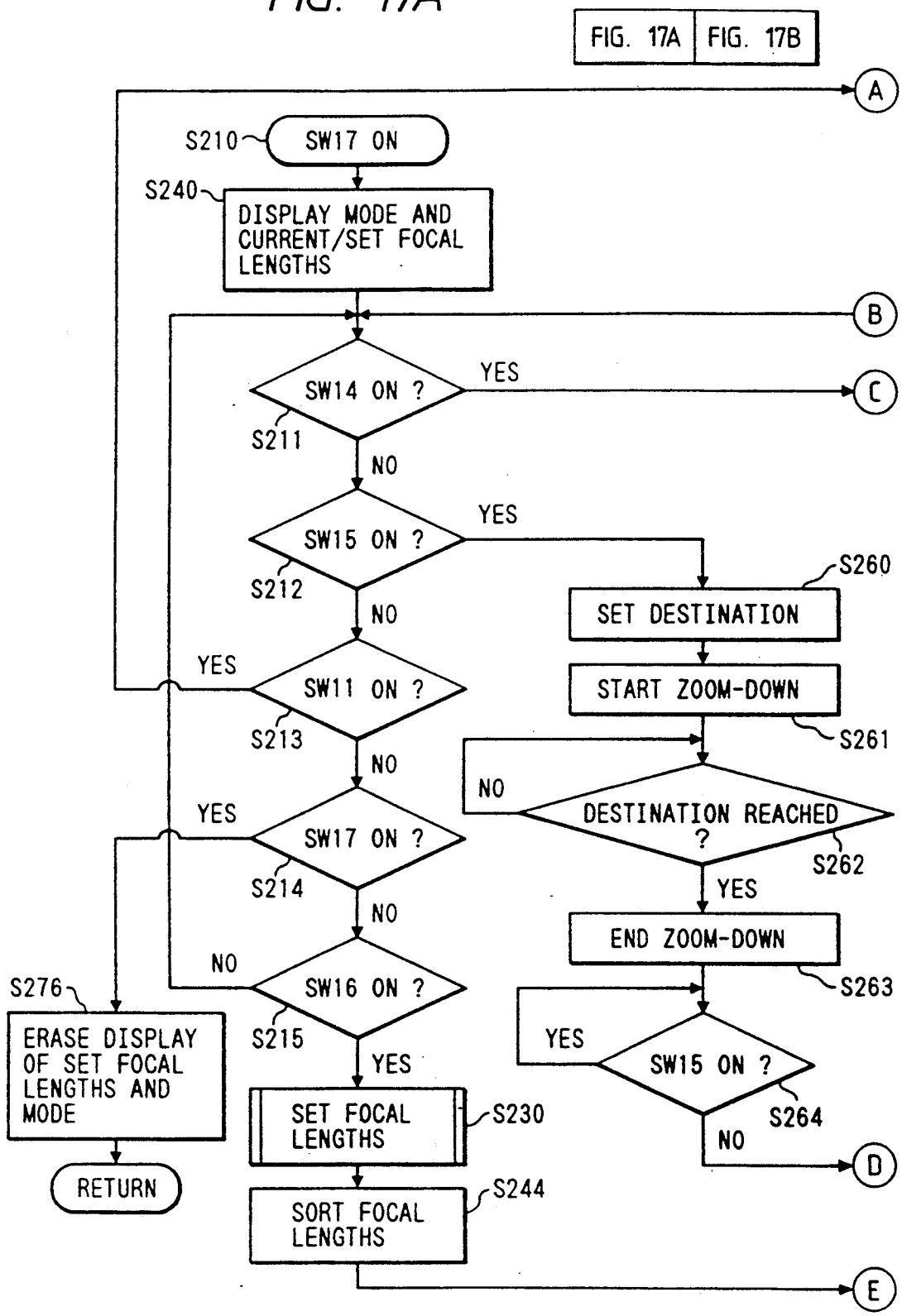

ELECTRIC ZOOMING CAMERA

This is a continuation of application Ser. No. 762,083 filed Sep. 19, 1991, which is a continuation of application Ser. No. 603,259 filed Oct. 26, 1990, which is a continuation of application Ser. No. 428,519 filed Oct. 30, 1989, all now abandoned.

BACKGROUND OF THE INVENTION

1. Field of the Invention

The present invention relates to an electric zooming camera equipped with a motor-driven zoom lens, and more particularly to such camera in which zooming is automatically conducted according to predetermined information.

2. Related Background Art

There is already known an electric zoom camera capable of photographing with a constant image magnification. The constant magnification photographing is to record the object in substantially the same size (same photographing magnification) in the photographing frame, regardless of the distance to the object (object distance). An improvement on such camera is disclosed in commonly assigned U.S. Pat. application Ser. No. 301,050 filed Jan. 24, 1989, now U.S. Pat. No. 4,896,177 issued Jan. 23, 1990. That application discloses a camera which, in response to the half-push operation of a shutter release button, detects the object distance by a distance measuring device, then calculates such focal length as to photograph the object with a magnification corresponding to the preselected object size according to thus detected object distance and drives the zoom lens to thus calculated focal length, and, in response to the subsequent full-push operation of the shutter release button, effects the photographing operation.

In the camera of the above-mentioned preceding application, the operator selects a desired one of predetermined object sizes. Since such selectable object sizes are limited, the operator may encounter a case where a desired size cannot be obtained.

In most of the conventional electric zoom cameras, a reversible motor for varying the focal length of the zoom lens is controlled by a manual operation of a see-saw switch provided on the camera body, and the see-saw switch is released to terminate the zooming operation when the image of the object observed in a view finder reaches a suitable size in the viewing field.

In such conventional electric zoom camera, the zooming operation is cumbersome because it has to be started and terminated under the observation of change in size of the object image.

SUMMARY OF THE INVENTION

An object of the present invention is to enable constant magnification photographing at any object size.

For attaining this object, the present invention is applied to a constant magnification photographing apparatus of a camera, provided with a zoom lens, a zoom operating member to be actuated for varying the focal length of said zoom lens, drive means for driving said zoom lens and thereby varying the focal length thereof in response to the actuation of said zoom operating member, and a view finder of which the viewing field varies corresponding to the change in the focal length of said zoom lens.

The apparatus is provided with focal length detecting means for detecting the focal length of the zoom lens, object distance detecting means for detecting the object distance, signal generator means for generating a photographing magnification setting signal in response to the actuation of a magnification setting member, photographing magnification setting means for calculating the photographing magnification based on the focal length and the object distance detected respectively by the focal length detecting means and the object distance detecting means and storing said photographing magnification in a memory area, and focal length setting means for setting the focal length in such a manner that the object is photographed with said stored photographing magnification based on the object distance detected by said object distance detecting means.

The zoom operating member is actuated while the object is observed in the view finder, thereby bringing the zoom lens to a focal length providing a desired image. Then the magnification setting member is actuated, whereby the photographing magnification setting means calculates the photographing magnification, based on the focal length and the object distance respectively detected by the focal length detecting means and the object distance detecting means at the generation of the photographing magnification setting signal, and stores said photographing magnification in a memory area. The focal length setting means sets the focal length in such a manner that the object is photographed with the stored photographing magnification, based on the object distance detected by the object distance detecting means. The drive means drives the zoom lens to the set focal length.

Another object of the present invention is to provide an electric zoom camera capable of presetting plural focal lengths for the zoom lens and bringing the zoom lens to thus preset plural focal lengths by a simple additional operation.

The above-mentioned object can be attained, according to the present invention, by a camera provided with drive means for driving an electric zoom mechanism, detector means for detecting focal length information varying with the movement of the zoom lens, focal length selecting means for arbitrarily selecting said focal length information detected by said detector means, memory means for storing plural focal length information selected by said focal length selecting means, and control means for automatically terminating the function of said drive means when the focal length information stored in said memory means coincides with the focal length information of the zoom lens detected by said detector means.

The focal length selecting means comprises display means for displaying the focal length information output by the detector means and focal length input means for entering the focal length information into the memory means. The focal length input means is composed of an electric switch linked with the half-push operation of the shutter release button, and is adapted to enter said focal length information into said memory means when the shutter release button is half pushed.

When the drive means drives the electric zoom mechanism, the focal length of the zoom lens is varied to alter the photographing angle. The position of said zoom lens is detected by the detector means, and is output as the focal length information of the zoom lens. Plural focal length information are arbitrarily selected by the focal length selecting means, according to the intention of photographing, and stored in the memory means. At the photographing operation, the control means causes the drive means to drive the zoom lens until the focal length information of the zoom lens, detected by the detector means, coincides with that stored in the memory means.

In such operation, if the control means is set in a sequence zoom shooting mode, plural shots with different image angles can be made in succession merely by the actuation of the shutter release button. Also, if it is set in a step zoom mode, the zoom lens is driven to a preset focal length at each predetermined operation.

BRIEF DESCRIPTION OF THE DRAWINGS

FIGS. 7 and 8 are flow charts of control sequences by a central processing unit of the constant magnification photographing apparatus constituting another embodiment of the present invention;

FIG. 9 is a block diagram of a control unit of a camera constituting still another embodiment of the present invention;

DETAILED DESCRIPTION OF THE PREFERRED EMBODIMENTS

Figure 1:
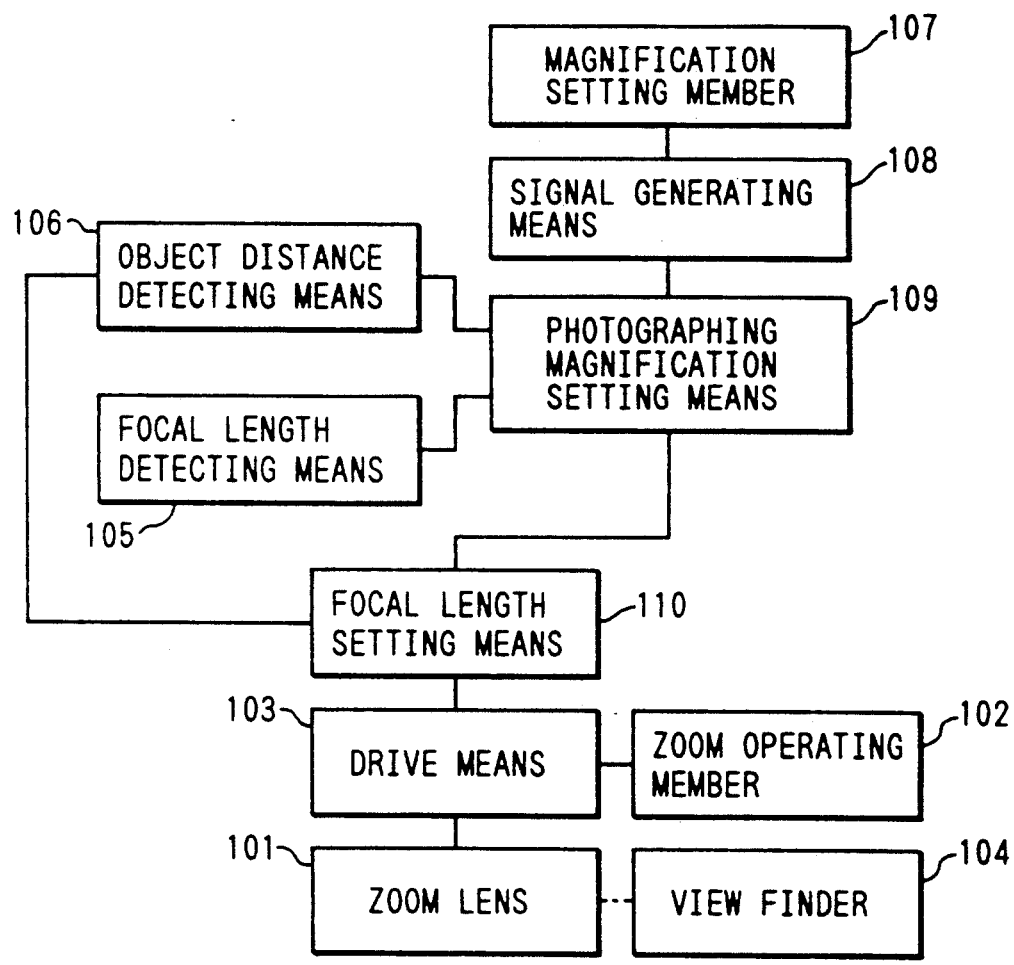
FIG. 1 is a block diagram of a constant magnification photographing apparatus of a camera constituting an embodiment of the present invention.

FIG. 1 is a block diagram of a constant magnification photographing unit of a camera constituting an embodiment of the present invention. The constant magnification photographing unit is composed of a zoom lens 101; a zoom operating member 102 to be actuated for varying the focal length of said zoom lens 101; drive means 103 for driving the zoom lens 101 thereby varying the focal length thereof in response to the actuation of said zoom operating member 102; a view finder 104 of which the image field varies corresponding to the change in focal length of the zoom lens 101; focal length detecting means 105 for detecting the focal length of the zoom lens 101; object distance detecting means 106 detecting the object distance; signal generator means 108 for generating a photographing magnification setting signal in response to the actuation of a magnification setting member 107; photographing magnification setting means 109 for calculating the photographing magnification, based on the focal length and the object distance respectively detected by the focal length detecting means 105 and the object distance detecting means 106 when said photographing magnification setting signal is generated, and storing said photographing magnification in a memory area; and focal length setting means 110 for setting the focal length in such a manner that the object is photographed with said stored photographing magnification, based on the object distance detected by the object distance detecting means 106.

The above-mentioned constant magnification photographing unit functions in the following manner. The zoom operating member 102 is actuated with the observation of the object in the view finder 104 to drive the zoom lens 101 to a focal length providing a desired image frame. Then the magnification setting member 107 is actuated, whereby the photographing magnification setting means 109 calculates the photographing magnification and stores it in the memory area, based on the focal length and the object distance respectively detected by the focal length detecting means 105 and the object distance detecting means 106 when the photographing magnification setting signal is generated. The focal length setting means 110 sets the focal length in such a manner that the object is photographed with the stored photographing magnification, based on the object distance detected by the object distance detecting means 106. The drive means 103 drives the zoom lens 101 to the set focal length.

Now reference is made to FIGS. 2 to 6 for explaining a more detailed embodiment of the constant magnification photographing unit of the present invention.

Figure 2:
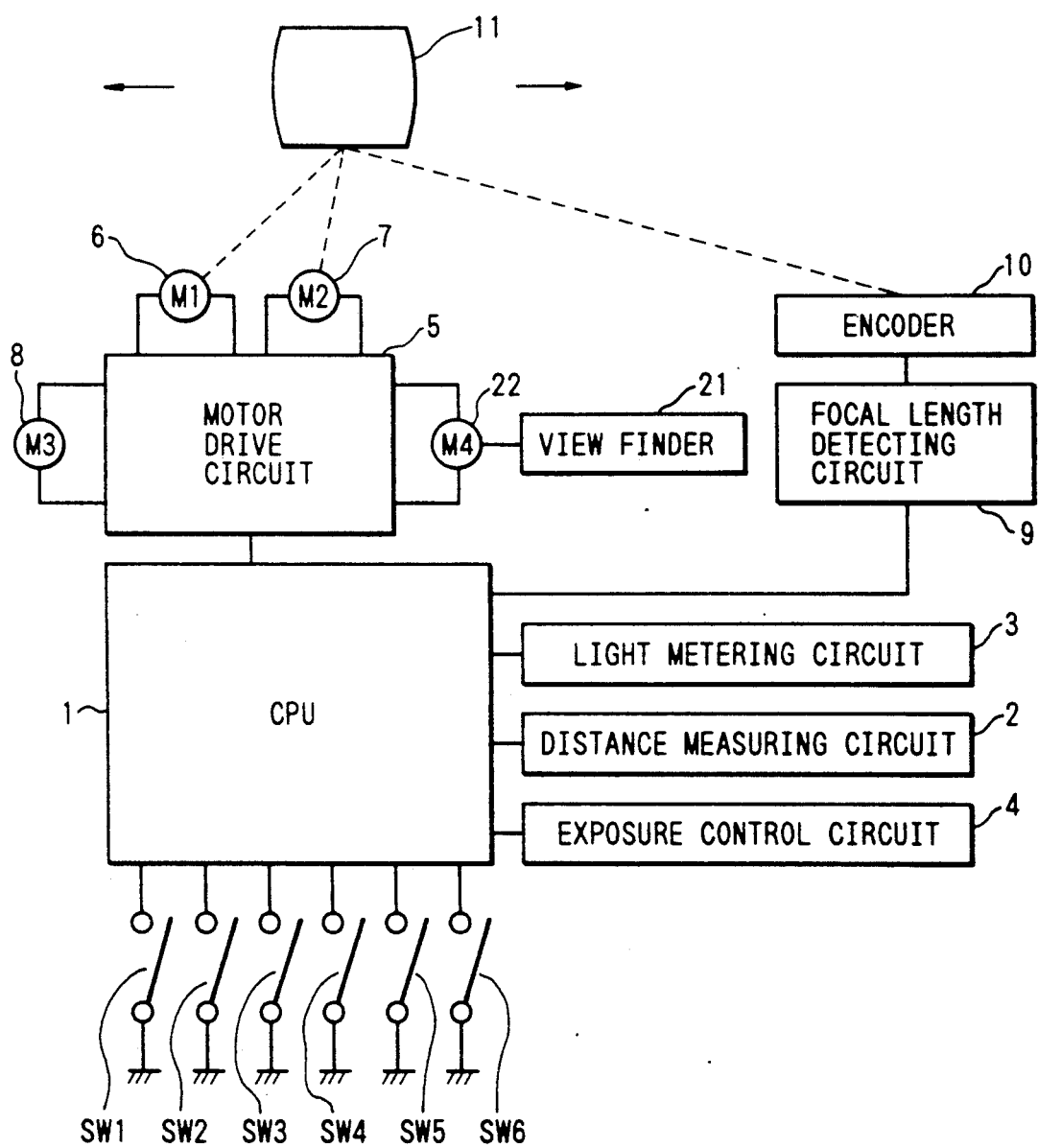
FIG. 2 is a more detailed block diagram of said embodiment.

Referring to FIG. 2 showing the entire structure, a CPU 1 for sequence control of the entire camera is connected to a distance measuring circuit 2, a light metering circuit 3, an exposure control circuit 4, a motor drive circuit 5 and a focal length detecting circuit 9.

The distance measuring circuit 2 detects information on the distance to the object (object distance) and enters the same into the CPU 1. The light metering circuit 3 detects luminance information, concerning the luminance of the object, and enters the same into the CPU 1.

The motor drive circuit 5 is connected to a focusing motor 6, a zooming motor 7, a film winding motor 8 and a zooming motor 22 of the view (zoom) finder 21. The motor drive circuit 5, in response to a zooming signal from the CPU 1 to be explained later, causes the motor 7 to drive the zoom lens 11, thereby varying the focal length thereof. Also in linkage with the zooming of said lens 11, the zooming motor 22 drives a lens in the view finder 21, thereby varying the image angle of said finder corresponding to the focal length of the photographing lens 11. Furthermore, the motor drive circuit 5 causes, in response to a focusing signal from the CPU 1, the focusing motor 6 to drive the lens 11 to a predetermined focusing position, and, in response to a film winding signal, the film winding motor 8 to advance the photographic film by a frame.

The focal length detecting circuit 9 is connected to an encoder 10 for detecting the position of the photographing lens 11, detects the current focal length of the lens 11 from the output of said encoder 10 and enters said focal length into the CPU 1.

The exposure control circuit 4 executes the exposure operation by driving exposure control devices such as a diaphragm, a shutter etc. in response to an instruction from the CPU 1.

The CPU 1 is further connected to six switches SW1-SW6. The switches SW1, SW2 are linked with a shutter release button (not shown). The switch SW1 is closed while said button is half pushed or fully pushed, while the switch SW2 is closed while said button is fully pushed. In response to the closing of the switch SW1, the CPU 1 activates the distance measuring circuit 2, light metering circuit 3 etc. mentioned above. Also in response to the closing of the switch SW2, the CPU 1 activates the motor drive circuit 5, exposure control circuit 4 etc. thereby effecting a photographing operation.

The switches SW3, SW4 are actuated in relation to the manipulation of a zooming button (zoom operating member 102 shown in FIG. 1). The switch SW3 or SW4 is closed while one or the other end of a see-saw type zooming button is pressed. In response to the closing of the switch SW3 or SW4, the CPU 1 sends a zooming signal to the above-mentioned motor drive circuit 5, thereby varying the focal length of the photographing lens 11 toward the telephoto side while the switch SW3 is closed, or toward the wide angle side while the switch SW4 is closed. Since the zooming button is a see-saw type, the switches SW3 and SW4 cannot be closed simultaneously.

The switch SW5 is closed in response to the actuation of a mode setting button (not shown), whereby the CPU 1 sets the constant magnification photographing mode for photographing with a constant object size, or a constant photographing magnification, regardless of the object distance. The mode is cancelled if the switch SW5 is closed when the mode has been already set.

The switch SW6 is closed in response to the actuation of a magnification setting button (not shown), thereby generating a photographing magnification setting signal. In response, the CPU 1 fetches the object distance and the focal length of the lens 11 respectively detected by the distance measuring circuit 2 and the focal length detecting circuit 9, calculates the photographing magnification from these data and stores it in the memory area. The above-mentioned constant magnification mode is also set by the closing of switch SW6, whereby the constant magnification photographing is conducted according to the stored photographing magnification, in response to the actuation of the shutter release button.

In the following there will be explained the control sequence of the CPU 1, with reference to flow charts shown in FIGS. 3 to 6.

Figure 3:
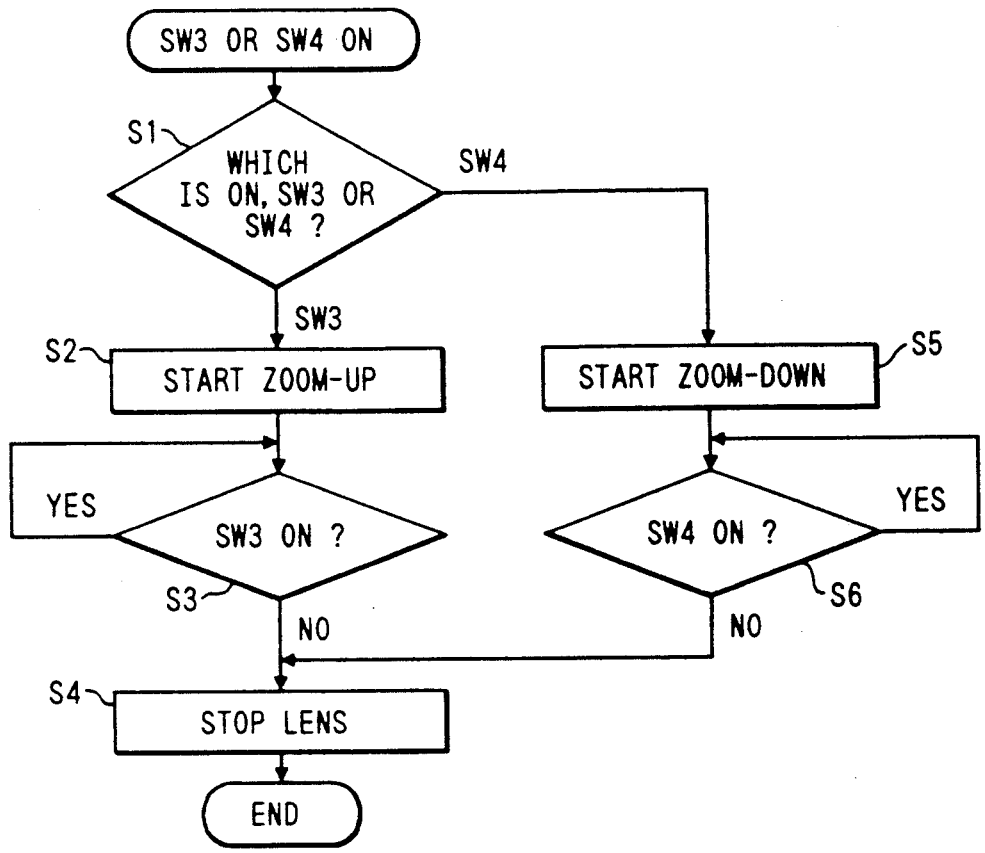
FIGS. 3 to 6 are flow charts of control sequences by a central processing unit of said embodiment.

FIG. 3 shows the sequence of manual zooming. This program is activated when the switch SW3 or SW4 linked with the zooming button is closed. At first a step S1 discriminates whether the switch SW3 or SW4 has been closed. If the switch SW3 is identified closed, a step S2 starts a zoom-up (zoom-in) process, by causing, through the motor drive circuit 5, the motor 7 to drive the lens 11 thereby varying the focal length thereof toward the telephoto side. Then a step S3 discriminates whether the switch SW3 is still closed, and, if closed, the sequence waits until the discrimination becomes negative. When it becomes negative a step S4 stops the lens 11 and the sequence is terminated.

On the other hand, if the step S1 identifies that the switch SW4 is closed, a step S5 starts a zoom down (zoom-out) process by causing, through the motor drive circuit 5, the motor 7 to drive the lens 11, thereby varying the focal length thereof toward the wide angle side. Then a step S6 discriminates whether the switch SW4 is closed, and, if closed, the sequence waits until the discrimination becomes negative. When it becomes negative, a step S4 stops the lens 11 and the sequence is terminated.

Figure 4:
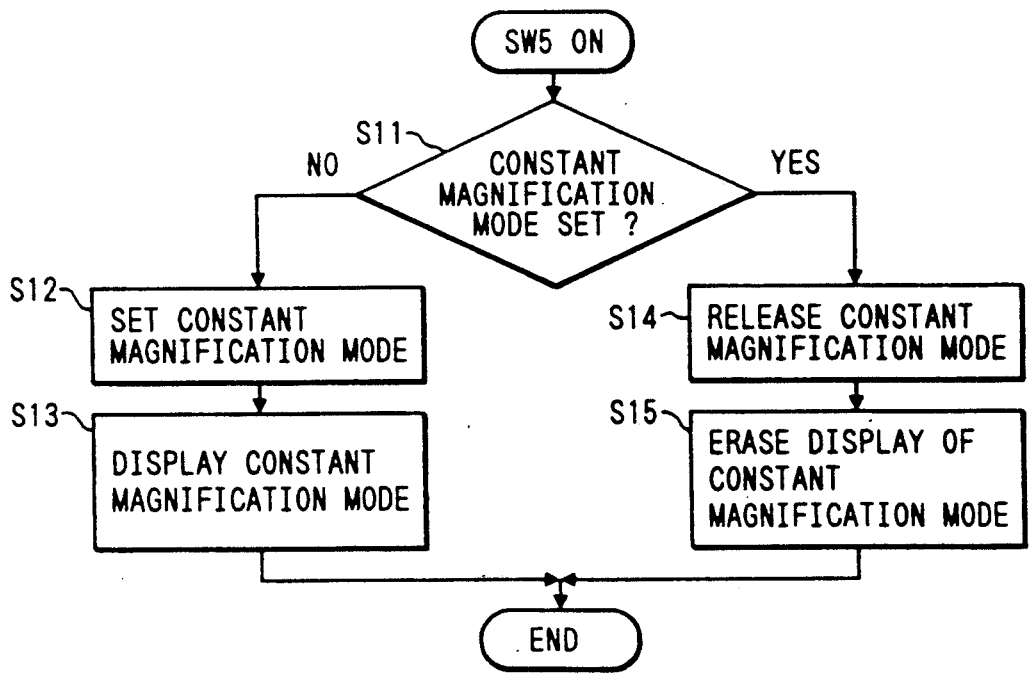

FIG. 4 shows the sequence of setting and cancelling the constant magnification photographing mode. This program is started when the switch SW5 is closed by the actuation of the mode setting button. At first a step S11 discriminates whether the constant magnification - photographing mode has been set, and, if not, a step S12 sets said mode, and a step S13 provides a display for said mode setting, for example on a liquid crystal display device thereby terminating the sequence. On the other hand, if the discrimination of the step S11 turns out affirmative, a step S14 releases the constant magnification photographing mode, and a step S15 erases a display to that effect, thereby terminating the sequence.

Figure 5:
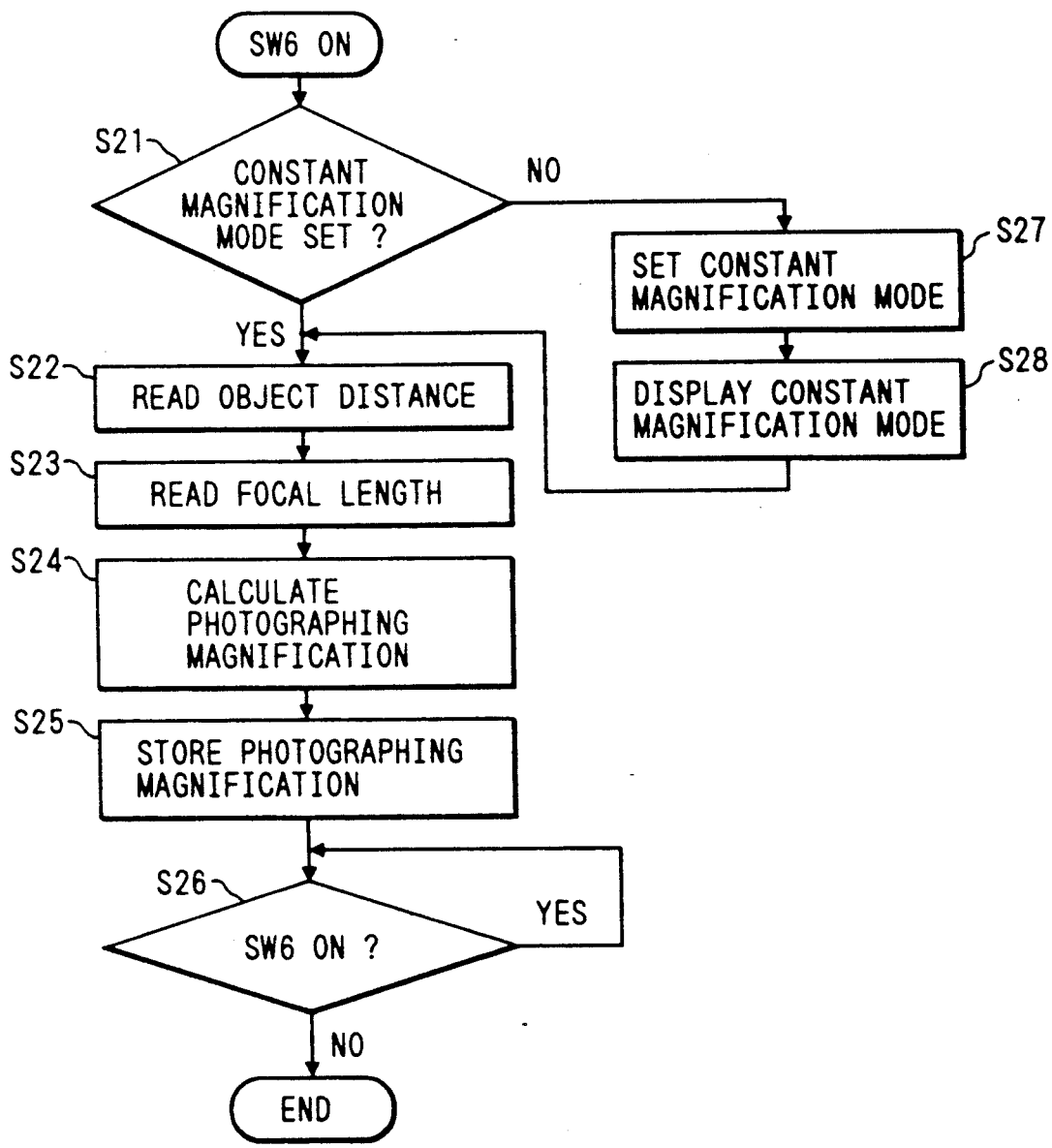

FIG. 5 shows the sequence of magnification setting. This program is activated when the switch SW6 is closed by the actuation of the magnification setting button. At first a step S21 discriminates whether the constant magnification photographing mode has been set, and, if set, the sequence proceeds to a step S22. If not, a step S27 sets the constant magnificaiton photographing mode, then a step S28 provides a display for said mode setting, and the sequence proceeds to the step S22.

The step S22 fetches the object distance from the distance measuring circuit 2. Then a step S23 fetches the focal length of the lens 11 from the focal length detecting circuit 9. Then a step S24 calculates the photographing magnification from the fetched object distance and focal length, and a step S25 stores thus calculated photographing magnification in the memory area. Then a step S26 discriminates whether the switch SW6 is still closed, and, if closed, the sequence waits until said discrimination becomes negative. When it becomes negative, the sequence is terminated.

Then the photographing sequence is explained with reference to FIG. 6.

This program is activated when the half-push switch SW1 is closed. At first a step S31 fetches the luminance information from the light metering circuit 3, and a step S32 fetches the object distance from the distance measuring circuit 2.

Then a step S33 discriminates whether the constant magnification photographing mode has been set, and the sequence proceeds to a step S34 or 37 respectively if said discrimination turns out affirmative or negative. The step S34 fetches the photographing magnification stored in the memory area in the step S25 shown in FIG. 5, and a step S35 calculates the focal length of the lens 11 corresponding to said photographing magnification, based on the object distance fetched in the step S32 and the photographing magnification fetched in the step S34. Then a step S36 sends the zooming signal to the motor drive circuit 5, thereby causing the motor 7 to drive the lens 11 to the calculated focal length.

Figure 6:
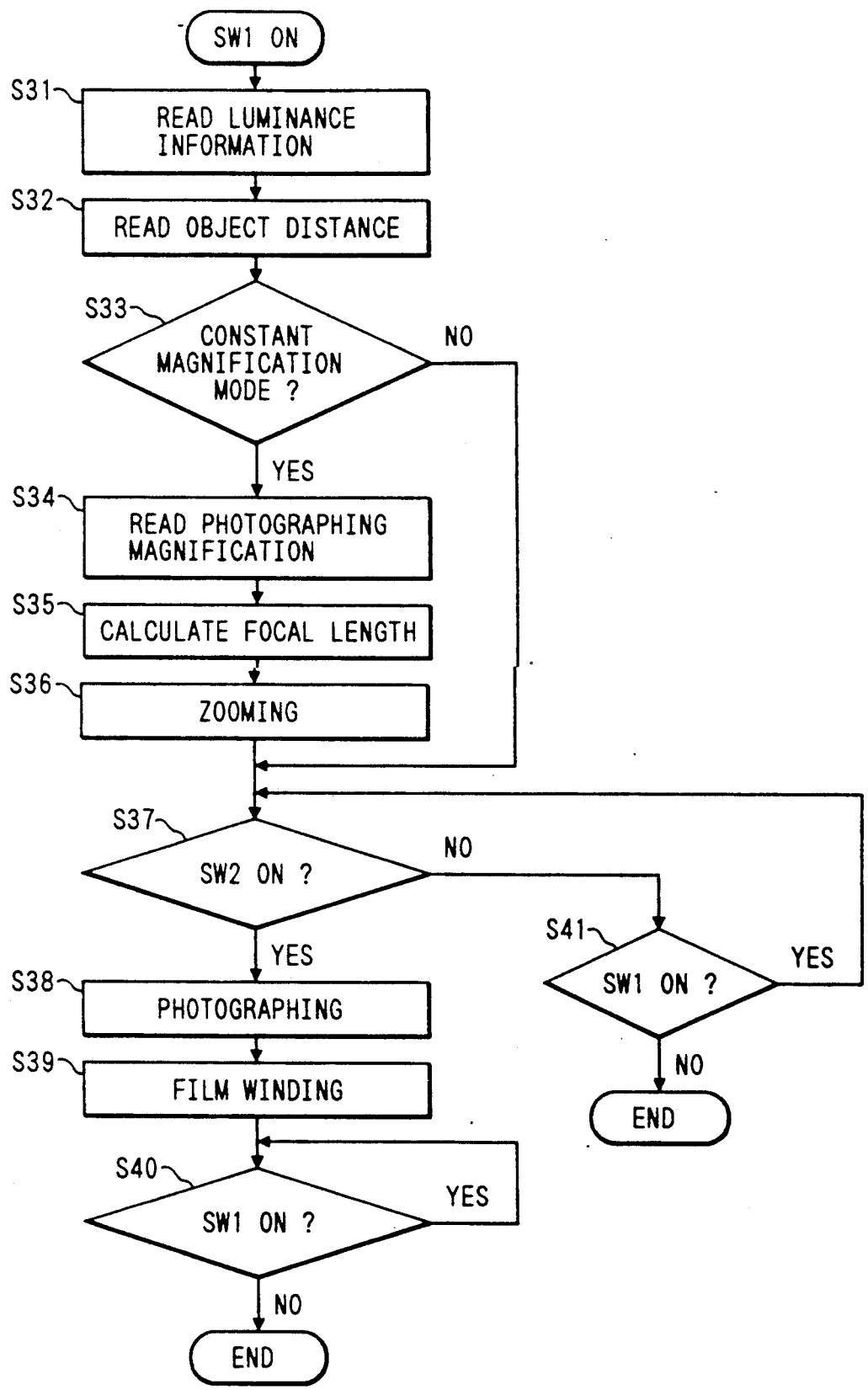

Thus, if the object distance fetched in the step S32 in FIG. 6 is larger than that fetched in the step S22 in FIG. 5, the lens is zoomed up until there is reached the photographing magnification calculated and stored in the steps S24, S25 shown in FIG. 5. On the other hand, if the object distance fetched in the step S32 in FIG. 6 is shorter than that fetched in the step S22 in FIG. 5, there is executed a zooming down operation until there is reached the photographing magnification calculated and stored in said steps S24, S25. Zooming is not conducted if the object distance fetched in the step S32 in FIG. 6 is equal to that fetched in the step S22 in FIG. 5.

Then a step S37 discriminates whether the full-push switch SW2 is closed. If not, a step S41 discriminates whether the half-push switch SW1 is closed. If closed the sequence returns to the step S37, but, if not closed, the sequence is terminated.

If the discrimination of the step S37 turns out affirmative, the sequence proceeds to a step S38 to effect the photographing operation. At first a focusing signal corresponding to the object distance fetched in the step S32 is supplied to the motor drive circuit 5 to move, by the motor 6, the photographing lens 11 to a focused position. Then an exposure value is calculated from the luminance information fetched in the step S31, and exposure is made by driving exposure control devices such as shutter and diaphragm according to said exposure value. Then a step S39 causes the motor drive circuit 5 to activate the motor 8 for advancing the film by a frame.

Then a step S40 discriminates whether the half-push switch SW1 is closed, and, if closed, the sequence waits until said discrimination becomes negative. If said switch is identified closed, the sequence is terminated.

In the following there will be explained an example of the constant magnification photographing operation according to the above-explained procedure.

At first, if the object in the viewing field of the view finder 21 is not of the desired size, the zooming button is actuated while the object is observed in the view finder 21, thereby zooming the photographing lens 21 until the desired object size is obtained. The zooming is conducted according to the program shown in FIG. 3. Then the mode setting button is actuated to close the switch SW5, whereby the program shown in FIG. 4 is activated to set the constant magnification photographing mode. Then the magnification setting button is actuated to close the switch SW6, whereby the photographing magnification corresponding to the above-mentioned object size is calculated according to the object distance and focal length fetched according to the program of FIG. 5 and is stored. Subsequently the shutter release button is half pushed whereby the switch SW1 is closed. Thus, as shown in FIG. 6, based on the fetched object distance and the stored photographing magnification, there is calculated the focal length of the photographing lens 11 so as to obtain said magnification, and the lens 11 is so driven as to obtain said focal length. Thereafter the photographing operation is conducted by the full-push operation of the shutter release button. It is naturally possible to select the object size by zooming according to the program shown in FIG. 3, after the constant magnification photographing mode is set according to the program shown in FIG. 4.

While the constant magnification mode is set, the photographing is conducted with the stored photographing magnification every time the shutter release button is actuated. Also when the constant magnification mode is once cancelled and reset by the mode setting button, the photographing is conducted according to the photographing magnification stored previously. The magnification setting button is operated again as explained above, in case the photographing magnification is to be changed.

In the following there will be explained another embodiment of the present invention with reference to FIGS. 7 and 8, wherein the same steps as those in FIGS. 5 and 6 are numbered the same.

In the foregoing embodiment, the photographing magnification at the constant magnification photographing is set by the magnification setting button. In the present embodiment, said magnification is set by the half-push operation of the shutter release button.

Figure 7B:
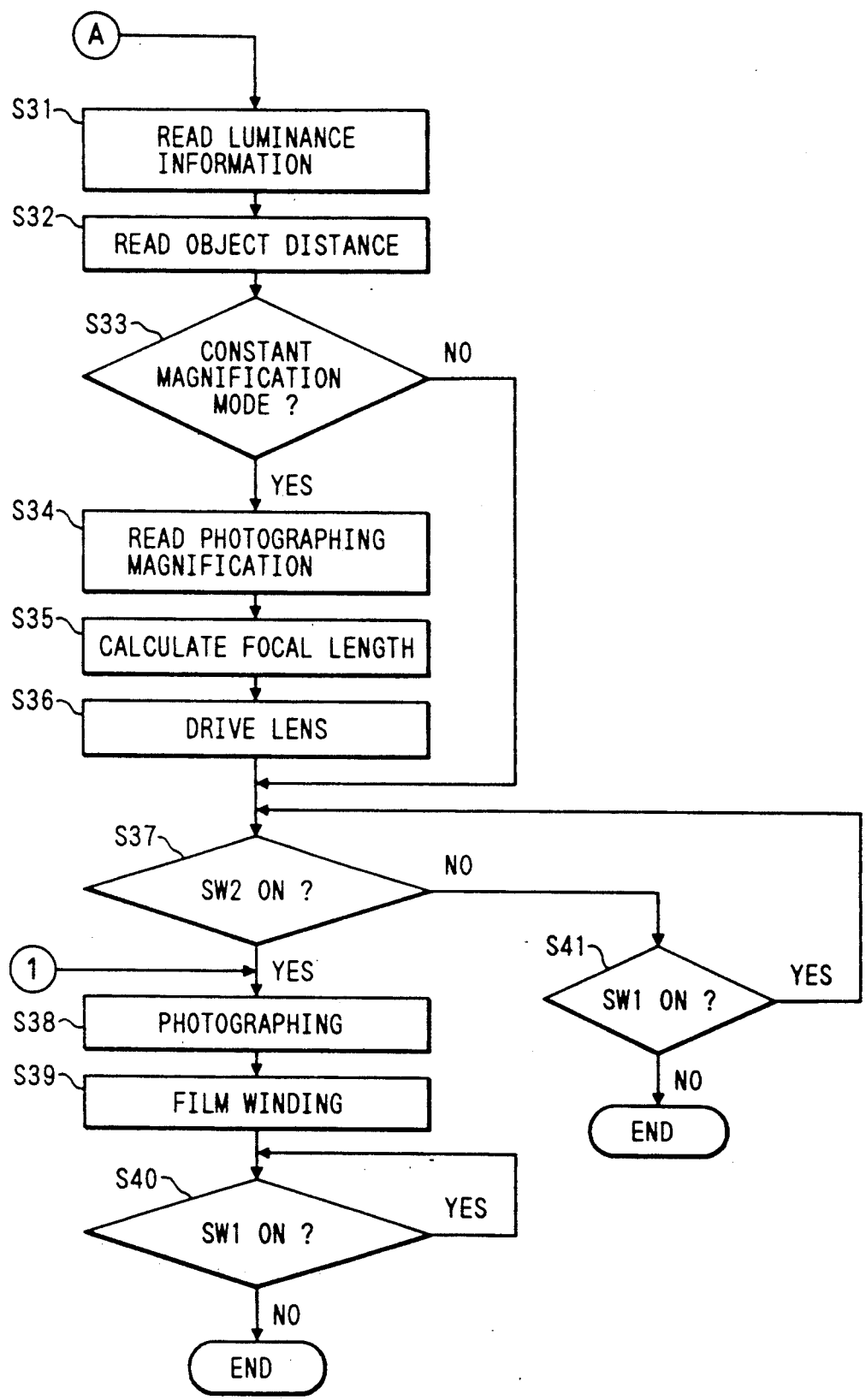

The program shown in FIG. 7 is activated when the half-push switch SW1 is closed. At first a step S51 discriminates whether a half-push flag has been set, and, if not, a step S52 sets the half-push flag F. Said half-push flag F is set in said step S52, and is released by a step S61 immediately after the setting of the constant magnification photographing mode in step S12 in FIG. 8. Consequently the negative discrimination in the step S51 indicates that the switch SW1 is closed by a first half-push operation after the setting of the constant magnification photographing mode.

If the discrimination in the step S51 turns out negative, the step S52 sets the half-push flag F, and the calculation and storage of photographing magnification are executed in the above-explained steps S22–S25. Then a step S53 discriminates whether the full-push switch SW2 is closed, and, if not, a step S54 discriminates whether the half-push switch SW1 is closed. If it is closed or not, the sequence returns to the step S53 or is terminated, respectively. If the discrimination of the step S53 turns out affirmative, a step S55 reads the luminance information from the light metering circuit 3, and the sequence proceeds to a step S38.

On the other hand, if the discrimination of the step S51 is affirmative, namely if the switch SW1 is closed by a second or later half-push operation after the setting of the constant magnification photographing mode, there is executed the photographing process according to the above-explained steps S31–S40. In this operation, the photographing magnification read in the step S34 is stored in the step S25. Also the exposure value at the photographing operation in the step S38 is calculated according to the luminance information read in the step S55 or S31.

As explained in the foregoing, the constant magnification mode is set according to the program in FIG. 4 in response to the actuation of the mode setting button, and, the photographing magnification is calculated and stored in response to the first half-push operation of the shutter release button, according to the object distance and the focal length of the lens 11 at said half-push operation. When the half-push operation is repeated thereafter, zooming is conducted in the steps S34–S36 so as to reach the photographing magnification stored in the first half-push operation, and the photographing operation is executed by the subsequent full-push operation of the shutter release button.

Consequently the present embodiment allows dispensing with the operating member for magnification setting, thereby simplifying the structure and reducing the cost.

In the foregoing embodiments there is employed a zoom finder 21 of which the viewing field is zoomed according to the focal length of the photographing lens 11, but there may be employed a view finder in which a viewing frame is moved according to the change in focal length of the lens 11.

Also the foregoing embodiments have been described with regard to a camera in which the object distance is detected by the distance measuring circuit 2, but the present invention is also applicable to a camera in which focusing is achieved without distance measurement, by the amount and direction of aberration between the image plane of the object and a predetermined image plane, as in a single-lens reflex camera. In such case it is possible to detect the position of the lens driven by focusing and to calculate the object distance from the lens position.

In the foregoing embodiments shown in FIGS. 1 to 8, in response to the actuation of the magnification setting member, the photographing magnification is calculated and stored according to the focal length of the zoom lens and the object distance at said actuation, and, at the photographing operation, the zoom lens is driven to a focal length at which the object is photographed with the stored magnification. Consequently the constant magnification photographing operation can be conducted with a magnification corresponding to the desired object size, by zooming to the desired object size while it is viewed in the view finder, then actuating the magnification setting member and depressing the shutter release button. It is thus possible to conduct constant magnification photographing with any object size, through a simple operation and without limitation in object size as in the conventional technology.

Figure 10:
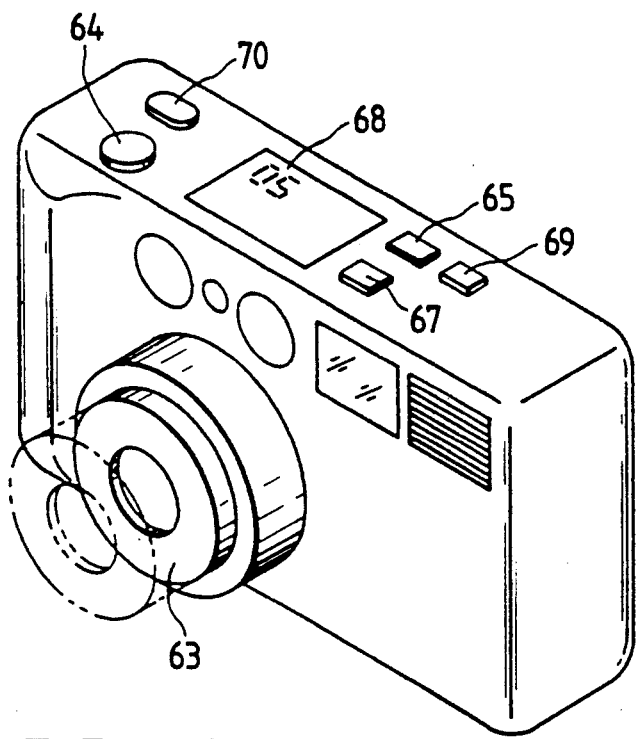
FIGS. 10 and 11 are respectively front and rear perspective view of said embodiment.

FIG. 9 is a block diagram of an operation control device of a camera constituting still another embodiment of the present invention; FIG. 10 is a front perspective view of a camera incorporating the operation control device shown in FIG. 9; and FIG. 11 is a rear perspective view of said camera.

Figure 11:
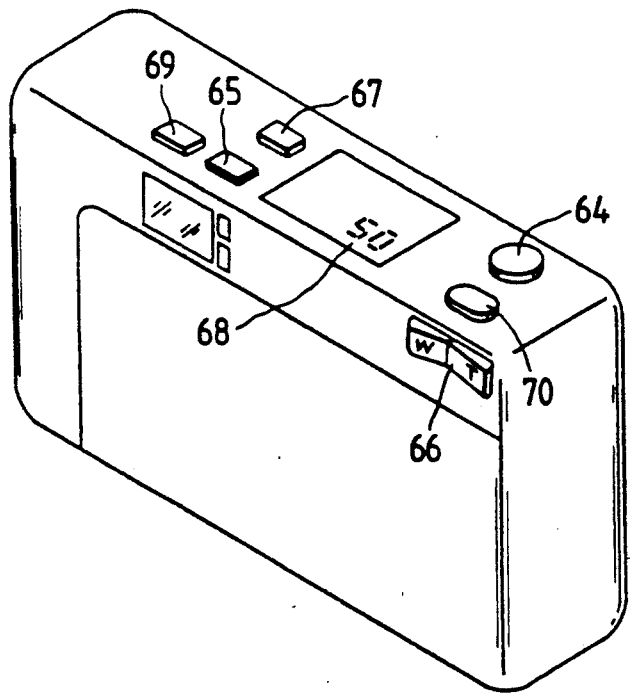

Referring to FIGS. 9 to 11, a CPU 51 for sequence control of the entire camera is connected to a distance measuring circuit 52, a light metering circuit 53, an exposure control circuit 54, a motor drive circuit 55 and a focal length detecting circuit 55. The motor drive circuit 55 is connected to a focusing motor 57, a zooming motor 58 for power zooming, and film winding motor 59. The CPU 51 is further connected to a memory circuit 60, and a display circuit 62 for driving a liquid crystal display (LCD) unit 61.

The distance measuring circuit 52 calculates and outputs information on the object distance, while the light metering circuit 53 calculates and outputs information on the luminance of the object. The CPU 51 calculates the moving amount of the lens for focusing according to the distance information from the distance measuring circuit 52, and causes the motor drive circuit 55 to drive the focusing motor 57, according to said lens moving amount, thereby focusing the photographing lens 63. Also the CPU 51 effects the photographing operation by controlling an exposure control member (not shown) through the exposure control circuit 54, based on the luminance information from the light metering circuit 53, and advances the film by the film winding motor 59 after the exposure operation.

The CPU 51 is further connected to a half-push switch SW11 and a full-push switch SW12, linked with the operation of a shutter release button 64 (cf. FIG. 10). Said half-push switch SW11 is closed when the shutter release button 64 is half or fully pushed, while the full-push switch SW12 is closed when said button 64 is fully pushed. In response to the closing of the half-push switch SW11, the CPU 51 activates the distance measuring circuit 52 and the light metering circuit 53. It also activates the exposure control circuit 54 and the motor drive circuit 55 in response to a release signal released by the closing of the full-push switch SW12.

The CPU 51 is further connected to a sequence zoom shooting mode setting switch SW13, which is closed by the actuation of a sequence zoom shooting mode setting button 65 shown in FIG. 10, whereby the CPU 51 sets said sequence zoom shooting mode and provides a corresponding display on the liquid crystal display unit 61 through the display circuit 62. When the half-push switch SW11 and the full-push switch SW12 are closed after the setting of said sequence zoom shooting mode, the CPU 51 alternately effects the zooming of the photographing lens 63 by the zooming motor 58 through the motor drive circuit 55 and the photographing operation, thereby achieving so-called sequence zoom shooting operation in which photographs are made in succession with predetermined plural focal lengths.

If the full-push switch SW12 is opened in the course of a sequence zoom shooting operation, the CPU 51 cancels the sequence zoom shooting mode. Also when the half-push switch SW11 is opened in the course of a sequence zoom shooting operation, said mode is cancelled if even a frame has been photographed.

The CPU 51 is further connected to a zoom-up switch SW14, a zoom-down switch SW15 and a memory switch SW16. Said switches SW14, SW15 are operated by a see-saw zooming button 66 (cf. FIG. 11) having a neutral off position and constituting the zoom operating means, whereby the CPU 51 zooms the photographing lens 63 up or down to an arbitrarily predetermined focal length through the motor drive circuit 55 and the zooming motor 58. The position of the lens 63 driven by the zooming motor 58 is detected by the focal length detecting circuit 56. The memory switch SW16 is closed in response to the actuation of a memory setting button 67 shown in FIG. 10.

When the memory switch SW16 is closed in the sequence zoom shooting mode, the CPU 51 clears all the memories in the memory circuit 60, thereby enabling the memory to store arbitrary focal lengths to be set for the sequence zoom shooting. In this state the CPU 51 can activate the zooming motor 58 through the motor drive circuit 55, in response to the closing of the zoom-up switch SW14 or zoom-down switch SW15, thereby zooming the lens 63 up or down to the arbitrarily predetermined focal length. Said zooming up or down can be terminated at a desired focal length by opening the zoom-up switch SW14 and the zoom-down switch SW15. The CPU 51 can also store the current focal length in the memory circuit 60, by closing the half-push switch SW11 by means of the shutter release button 64. This operation is possible until the memory enabled state is cancelled by the next closing of the memory switch SW16, and plural focal lengths can be stored in the order of entry.

The CPU 51 is further connected to a step zoom mode switch SW17, which is closed by the actuation of a step zoom mode setting button 69 shown in FIG. 10. When the zoom-up switch SW14 or the zoom-down switch SW15 is closed in said step zoom mode, the CPU 51 zooms the photographing lens 63 up or down stepwise to the position of a focal length to be set as will be explained later.

When a slidable power switch 70, positioned next to the shutter release button 64, is turned off, the photographing lens 63 sinks a little from the wide angle end position, and a lens barrier (not shown), for lens protection, is closed.

In the following there will be explained the control sequence of the CPU 51 in a normal photographing mode, with reference to flow charts shown in FIGS. 12 to 14.

Figure 12:
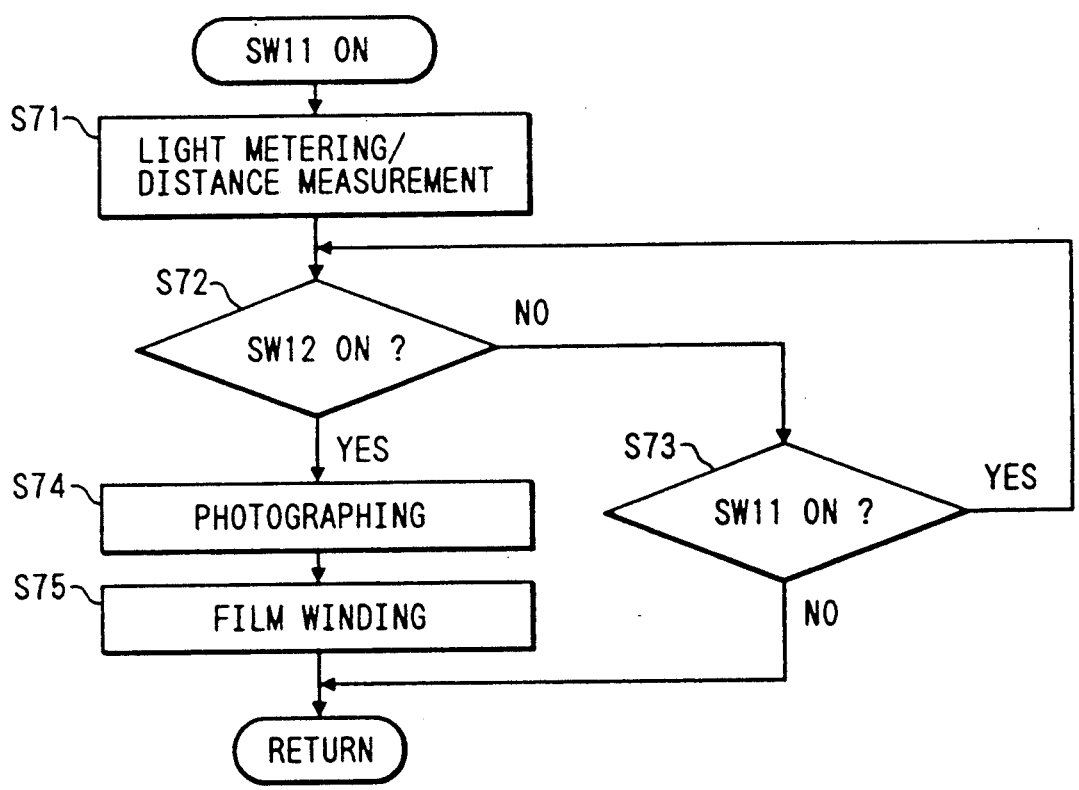
FIGS. 12 to 17 are flow charts of control sequences of a CPU of said embodiment.

FIG. 12 is a flow chart showing the control sequence of the CPU 51 in response to the actuation of the shutter release button in the normal photographing mode. When the half-push switch SW11 is closed by the half-push operation of the shutter release button 64, the light information from the light metering circuit 53 and the distance information from the distance measuring circuit 52 are read (step S71). Then there is discriminated whether the full-push switch SW12 is closed, by the full-push operation of said button 64 (step S72). If not, there is again discriminated whether the half-push switch SW11 is closed (step S73), and, if said discrimination turns out affirmative or negative, the sequence returns to the step S72 or is terminated. On the other hand, if the step S72 identifies that the shutter release button 64 is fully pushed, the sequence proceeds to a step S74 for effecting focusing according to the received distance information, and driving exposure control members (not shown) through the exposure control circuit 54 based on the light information, the film speed and the F-value of the photographing lens 63 corresponding to the selected focal length thereby effecting the photographing operation. Thereafter the film winding motor 59 is activated to advance the film by a frame, and the sequence is terminated.

Zoom Operation in the Normal Photographing Mode

Figure 13:
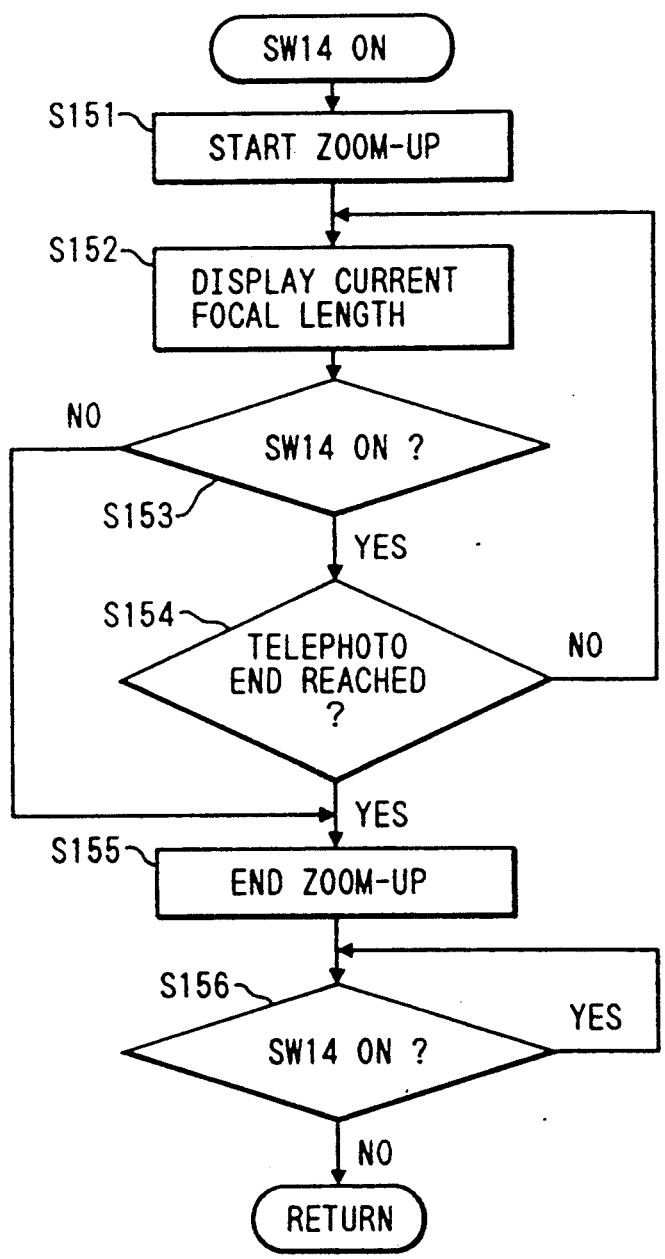

FIG. 13 is a flow chart of the control sequence when the zoom-up switch SW14 is closed in response to the actuation of the zooming button 66. When the zoom-up switch SW14 is closed by the actuation of the zooming button 66, a zoom-up operation of the photographing lens 63 is started (step S151), and the current focal length of the lens 63 is displayed on the liquid crystal display device 61 (step S152). Then there is discriminated whether the zoom-up switch SW14 is closed, namely whether the zooming button 66 continues to be depressed (step S153). If said switch is still closed, there is discriminated whether the lens 63 has reached the end of telephoto side (step S154). If the lens 63 has not reached the telephoto end, the sequence returns to the step S152, but, if the telephoto end has been reached, the zoom-up operation of the lens 63 is terminated (step S155) and the sequence proceeds to a step S156.

On the other hand, if the discrimination of the step S153 turns out negative, namely if the zoom-up switch SW14 is open due to the discontinuation of the actuation of the zooming button 66, the sequence proceeds to a step S155 for terminating the zoom-up operation of the lens 63. Then a step S156 discriminates whether the zoom-up switch SW14 continues closed, and the sequence waits during said closed state. When said switch is opened, the zoom-up process is terminated, and the sequence returns to the original routine prior to entering the zoom-up process.

Figure 14:
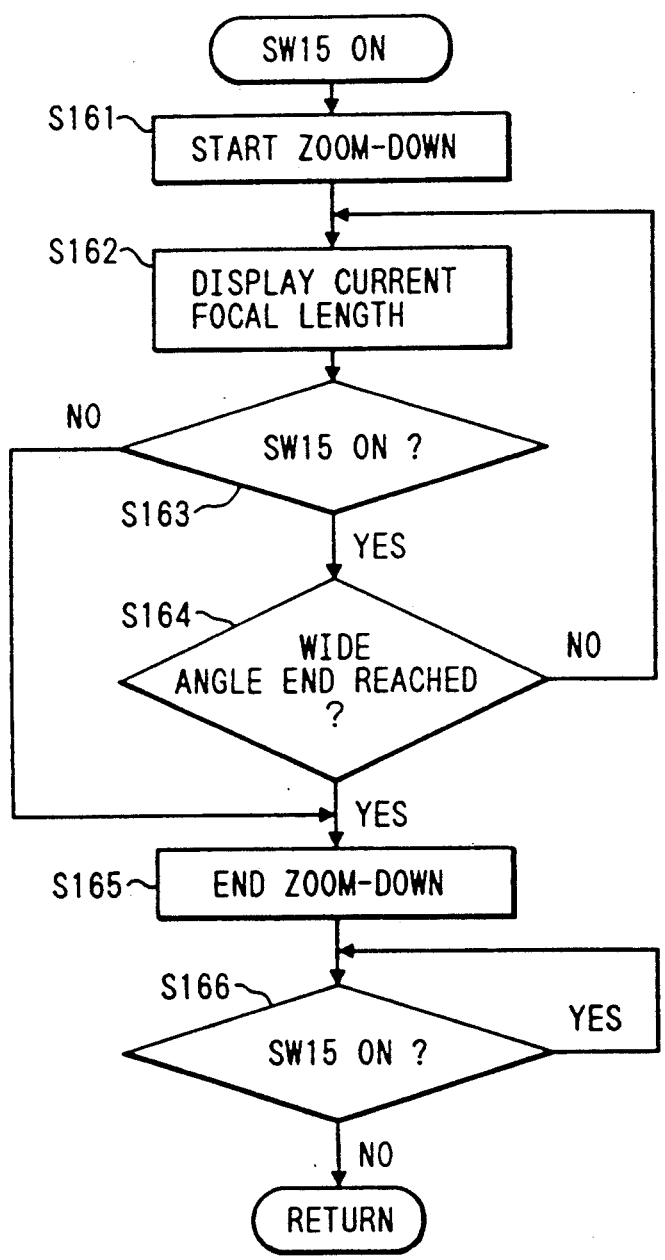

FIG. 14 is a flow chart of the control sequence when the zoom-down switch SW15 is closed by the actuation of the zooming button 66. When the zoom-down switch SW15 is closed by the zooming button 66, a zoom-down operation of the lens 63 is initiated (step S161), and the current focal length of the lens 63 is displayed on the liquid crystal display unit 61 (step S162). Then there is discriminated whether the zoom-down switch SW15 is closed, namely whether the actuation of the zooming button 66 still continues (step S163). If said switch is still closed, there is discriminated whether the lens has reached the end at the wide angle side (step S164), and, if the lens 63 has not reached the wide angle end, the sequence returns to the step S162. If the wide angle end has been reached, the zoom-down process of the lens 63 is terminated (step S165) and the sequence proceeds to a step S166.

On the other hand, if the discrimination of the S163 turns out negative, namely if the zoom-down switch SW15 is open due to the discontinuation of the actuation of the zooming button 66, a step S165 terminates the zoom-down operation of the lens 63 and the sequence proceeds to a step S166. Said step S166 discriminates whether the zoom-down switch SW15 continues closed, and, if it is closed, the sequence waits. If it is opened, the zoom-down process is terminated and the sequence returns to the original routine prior to entering the zoom-down process.

As explained above, the zooming button 66 can drive the photographing lens 63 arbitrarily between the telephoto end and the wide angle end in the normal photographing mode, but the zooming is terminated when the actuation of said button is released. In order to move the lens 63 to the telephoto end or the wide angle end, it is therefore necessary to continue the actuation of said button. Also in the present embodiment, the zoom finder 21 shown in FIG. 2 is preferably provided, in order to enable observation of the image in the course of normal zooming operation.

Sequence Zoom Shooting Mode

Function in Sequence Zoom Shooting Mode

Figure 15B:
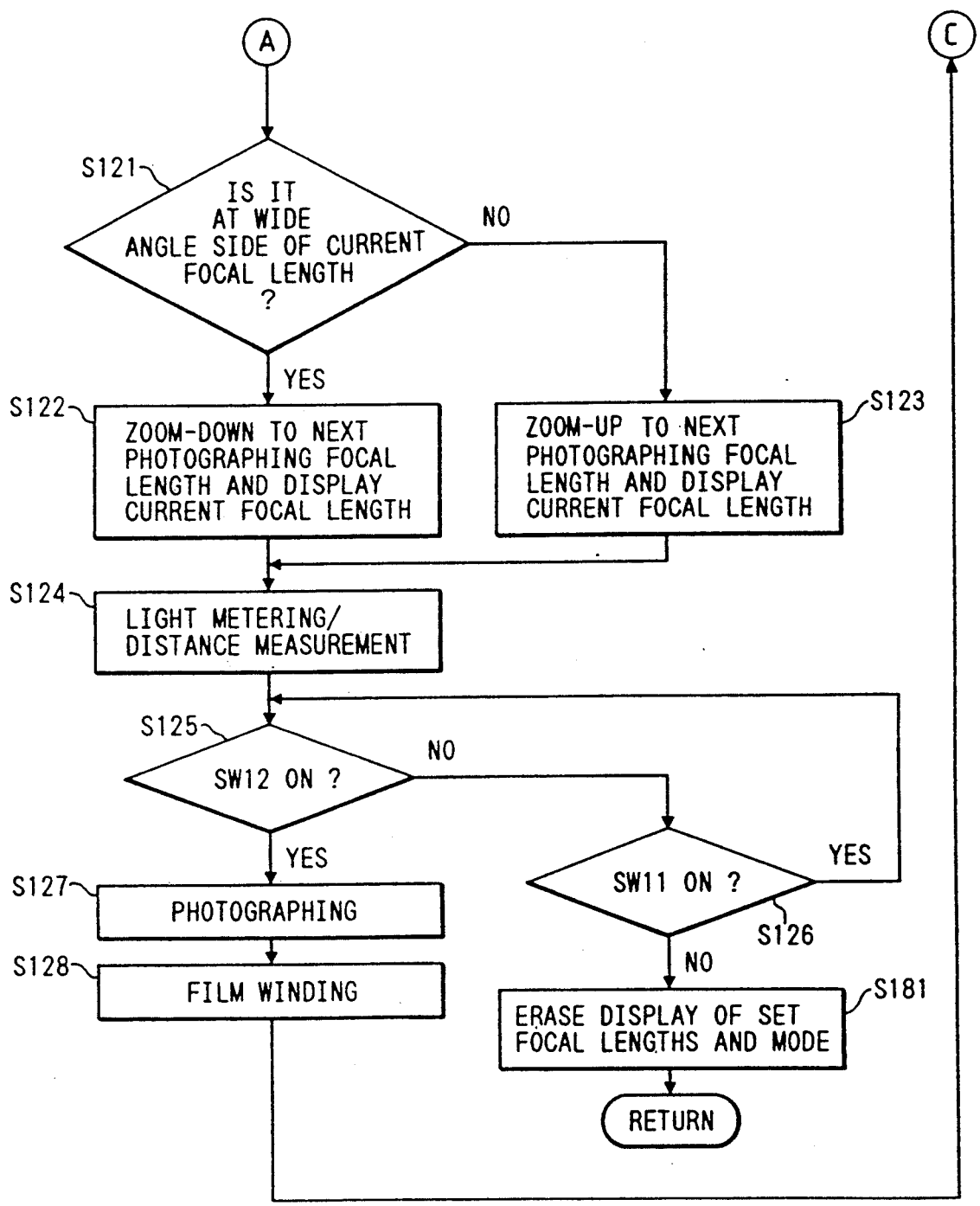
Figure 16:
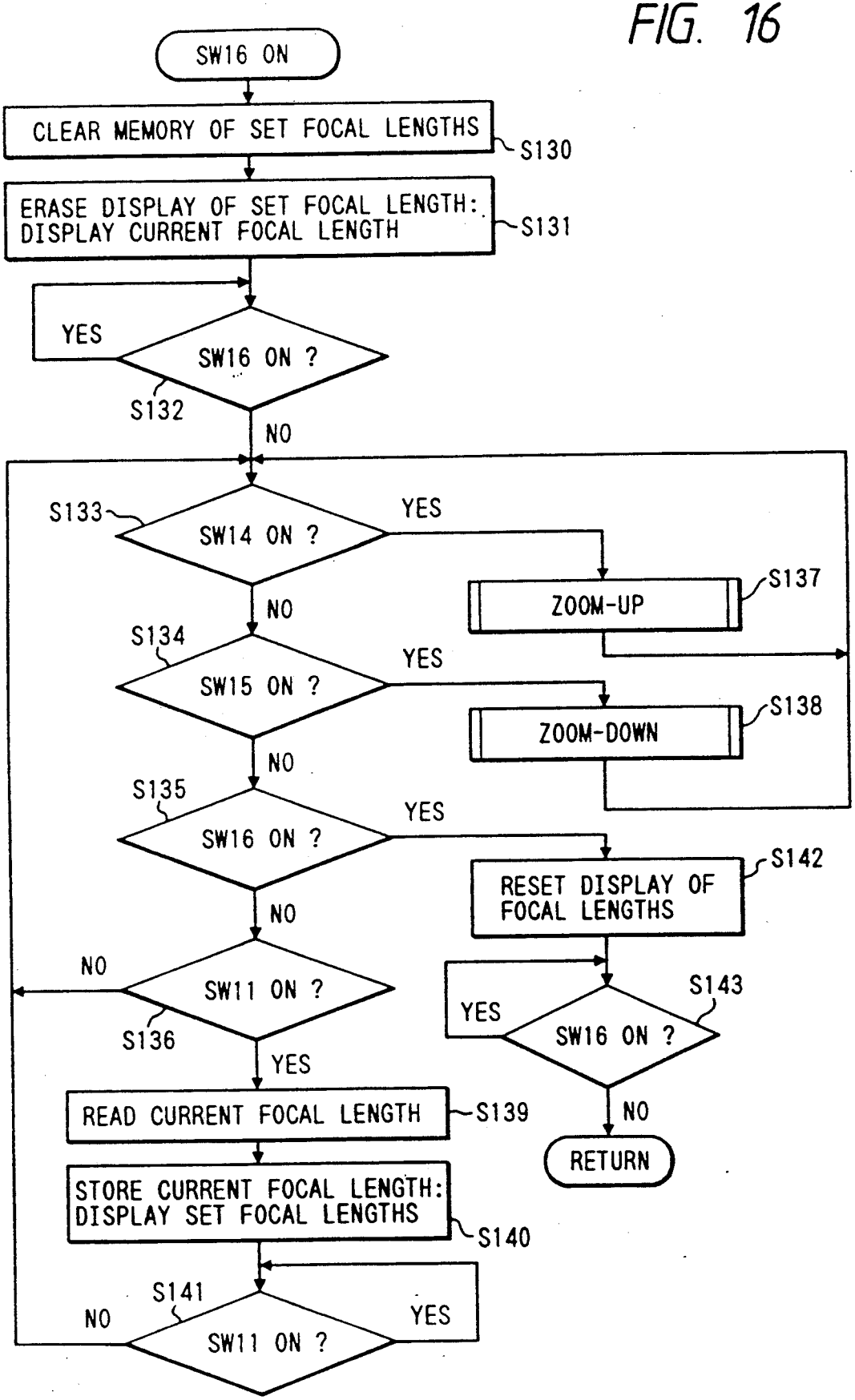
Figure 17B:
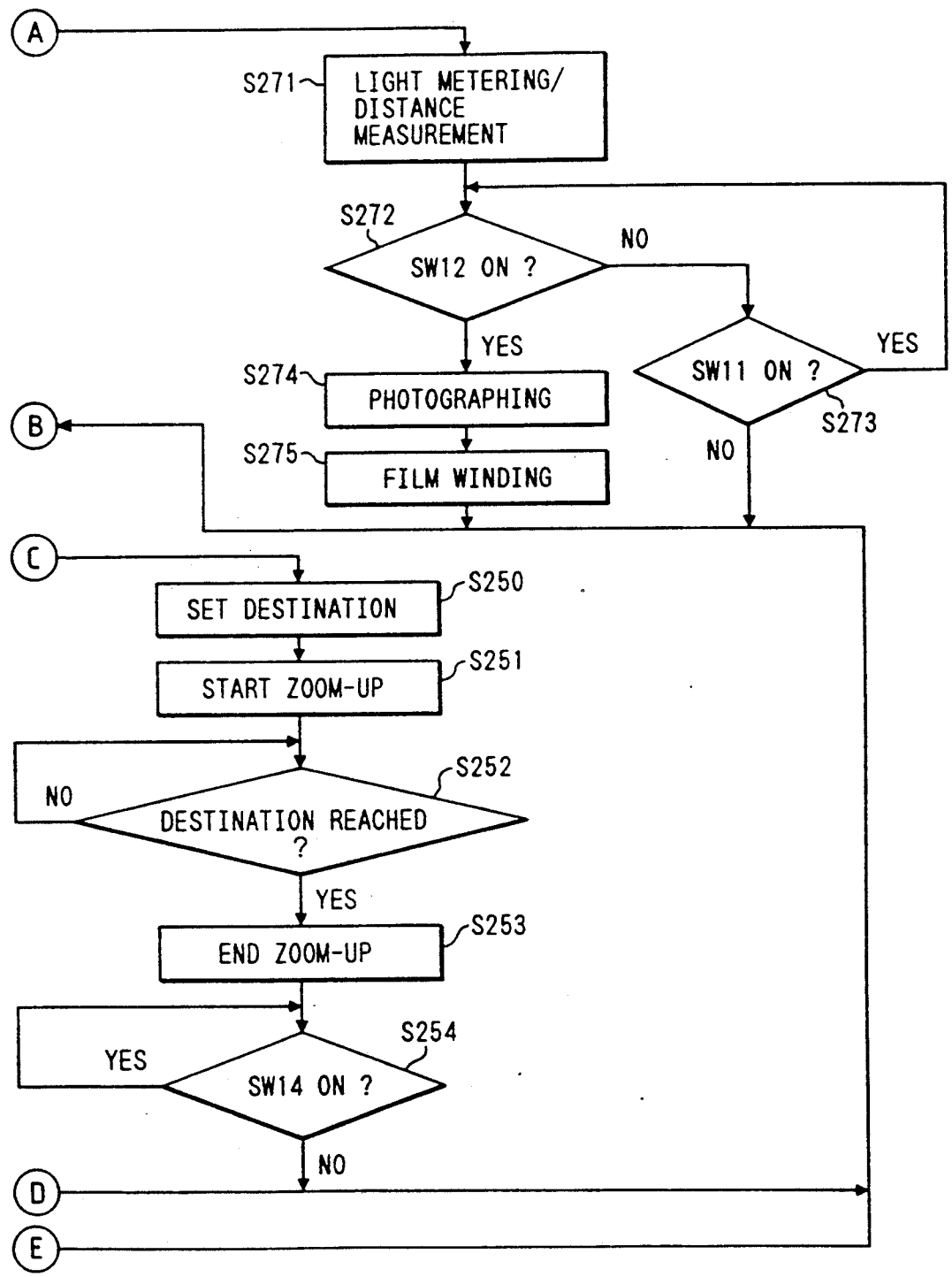

Now reference is made to FIGS. 15 to 17 for explaining the control sequence of the CPU 51 in the sequence zoom shooting mode.

Referring to FIG. 15, when the sequence zoom shooting mode is set by the sequence zoom shooting mode setting switch SW13 in response to the actuation of the sequence zoom shooting mode button 65, the liquid crystal display device 61 driven by the display circuit 62 shows the current focal length (for example 50 mm) of the photographing lens 63 together with a message indicating the setting of said mode. Also all the focal lengths stored in the memory circuit 60 are displayed in the order of entry (for example: 35, 40, 55, 38, 60, 45 and 80 mm). Said display is given, for example, in a form [50/SEQUENCE ZOOM SHOOTING/35-40-55-38-60-45-80]. Then there is discriminated whether the half-push switch SW11 is closed, namely when the shutter release button 64 is half pushed (step S114), and, if closed, the sequence proceeds to a step S115.

The step S115 reads, from the memory circuit 60, the number m of the focal lengths (f mm) set for the sequence zoom shooting. Then a step S116 sets the count of a counter to zero, and a step S117 compares the number m of the focal lengths set in the step S115 with the count n. If they are equal, a step S118 erases the display of the focal lengths stored in the memory circuit 60 and of the setting of the sequence zoom shooting mode on the LCD 61, merely leaving the current focal length of the lens 63, thus terminating the sequence zoom shooting operation.

If the comparison in the step S117 is not equal, a step S119 steps up the count of counter by one. Then a step S120 reads the set focal length (f mm) of n-th order (starting from n=1) from the memory circuit 60, and a step S121 discriminates whether said focal length is at the wide angle side in comparison with the current focal length. If it is at the wide angle side in comparison with the current focal length, a step S122 zooms the lens down to the next photographing focal length, and displays the current focal length, decreased by said zoom-down operation, on the LCD 61. If it is at the telephoto side, a step S123 zooms the lens up to the next photographing focal length, and displays the current focal length, increased by said zoom-up operation, on the LCD 61.

When the zooming is completed in the step S122 or S123, a step S124 reads the distance information from the distance measuring circuit 52 and the light information from the light metering circuit 53, and a step S125 discriminates whether the full-push switch SW12 is closed, namely whether the shutter release button 64 is fully pushed. If not, a step S126 discriminates whether the half-push switch SW11 is closed, namely whether the shutter release button 64 is half pushed. If not, a step S181 erases the displays of all the set focal lengths and of selection of the sequence zoom shooting mode on the LCD 61, merely leaving the current focal length of the lens 63, thereby terminating the sequence zoom shooting process. If the discrimination of the step S126 turns out affirmative, the sequence returns to the step S125.

On the other hand, if the discrimination of the step S125 turns out affirmative, a step S127 executes focusing based on the received distance information and drives exposure control members (not shown) through the exposure control circuit 54 based on the light information, the film speed and the F-value of the lens 63 corresponding to the selected focal length, thereby executing the photographing operation. Thereafter a step S128 drives the film winding motor 59 for advancing the film by a frame, and the sequence returns to the step S117.

On the other hand, if the discrimination of the step S114 turns out negative, the sequence proceeds to a step S129 for discriminating whether the memory switch SW16 is closed. If not, the sequence returns to the step S114, but, if closed, the sequence proceeds to a step S171 for a focal length setting process to be explained later in relation to FIG. 16, and thereafter returns to the step S114.

Focal Length Setting in Sequence Zoom Shooting Mode

The focal length setting process shown in FIG. 16 is initiated when the step S129 identifies that the memory switch SW16 is closed. At first a step S130 clears all the memories of the memory circuit 60 storing the focal lengths set for sequence zoom shooting. Then a step S131 erases, on the LCD 61, the display of the focal lengths through the display circuit 62, leaving the displays of the current focal length and of selection of the sequence zoom shooting mode. Then a step S132 discriminates whether the memory switch SW16 is closed, and, if not, the sequence enters a loop of steps S133, S134, S135 and S136 for awaiting the input to the switch.

If the step S133 identifies that the zoom-up switch SW14 is open, the step S134 discriminates whether the zoom-down switch SW15 is closed, and, if closed, the sequence proceeds to a step S138 for effecting the zoom-down process of the lens 63 according to the aforementioned program shown in FIG. 14. Subsequently the sequence returns to the step S133 and enters the loop of the steps S133, S134, S135 and S136 again.

If the step S134 identifies that the zoom-down switch SW15 is open, the step S135 discriminates whether the memory switch SW16 is closed, and, if not, the step S136 discriminates whether the half-push switch SW11 is closed. If not, the sequence proceeds to the step S133, again entering the loop of four steps S133, S134, S135 and S136.

On the other hand, if the step S136 identifies that the switch SW11 is closed, a step S139 reads the current focal length (f mm) from the focal length detecting circuit 56 for outputting a focal length signal based on the position of the lens tube of the photographing lens 63. Then a step S140 stores said focal length in the memory circuit 60, and adds the thus stored focal length to the display of the LCD 61. Thereafter a step S141 waits until the half-push switch SW11 is turned off, and, when said switch is turned off, the sequence returns to the step S133, entering the loop of the steps S133, S134, S135 and S136.

By repeating the steps S133-S136-S139-S141, it is possible to store an arbitrary number m of focal lengths for sequence zoom shooting in the order of entry in the memory circuit 60, and to display all the stored focal lengths on the LCD 61 through the display circuit 62. Said number m is limited by the capacity of the memory circuit 60.

On the other hand, if the step S135 identifies that the memory switch SW16 is closed, a step S142 a step S142 resets the display of focal lengths, while said memory switch SW16 is closed, and, when said switch SW16 is opened, the sequence returns to the original routine (step S114 in FIG. 15A).

In the foregoing embodiment, the exposures in the sequence zoom shooting mode are conducted in the order of entry, but said order may be arbitrarily changed according to the state of photographing. Also the number of exposures may be arbitrarily selected within the number of set focal lengths. The sequence zoom shooting mode is terminated when the film is used up, even if the exposures are not completed.

Step Zoom Mode

In FIGS. 15 and 16, there has been shown the sequence of an embodiment in which exposures are made in succession at arbitrarily preselected plural focal lengths. FIG. 17 is a flow chart showing the control sequence of an embodiment capable of step zooming in which the zooming to each set focal length is conducted in succession by a momentary zooming operation.

Focal Length Setting in Step Zoom Mode

Referring to FIG. 17, when, in step S210, a step zoom mode switch SW17 is closed by the actuation of a step zoom mode setting button 69, the program starts from a step S240, which displays, on the LCD 61 driven by the display circuit 62, the current focal length (for example 50 mm) of the lens 63, a message that the step zoom mode is set, and all the focal lengths stored in the memory circuit 60, in the order rearranged in the step S244 (for example, 35, 60, 71, 74 and 80 mm). Said display is given, for example, as [50/STEP ZOOM/35-60-71-74-80]. Then the sequence proceeds from the step S240 to S211.

A loop of steps S211, S212, S213, S214 and S215 awaits inputs respectively to the zoom-up switch SW14, zoom-down switch SW15, half-push switch SW11, step zoom mode switch SW17 and memory switch SW16. If the steps S211, S212, S213 and S214 respectively identify that the switches SW14, SW15, SW11 and SW17 are open, the sequence proceeds to the step S215, and, if the memory switch SW16 is closed, the sequence proceeds to a step S230 for the focal length setting as already explained in FIG. 16. Thereafter a step S244 compares the focal lengths and rearranges said focal lengths in the increasing order. After the memory operation explained above, the sequence returns to the step S211, thus entering again the loop of the steps S211, S212, S213, S214 and S215.

Function of Step Zoom Mode

Let us consider an example in which five focal lengths 35, 60, 71, 74 and 80 mm are stored in the focal length setting process shown in FIG. 16 and rearranged in the step S244. If the step S211 identifies that the zoom-up switch SW14 is closed, the sequence proceeds to a step S250 for reading the current focal length through the focal length detecting circuit 56, for setting the destination of the lens 63. In the present example, the destination of the lens 63 is 60 mm if the current focal length is equal to or larger than 35 mm but smaller than 60 mm. Likewise the destination is 71 mm if the current focal length is equal to or larger than 60 mm but smaller than 71 mm. Also it is 74 or 80 mm respectively if the current focal length is equal to or larger than 71 mm but smaller than 74 mm, or equal to or larger than 74 mm but smaller than 80 mm.

After the setting of the destination in the step S250 a step S251 starts the zoom-up operation of the lens 63. Then a step S252 awaits the arrival of the lens 63 at the destination, and a step S253 terminates the zoom-up operation upon arrival at the destination. Then a step S254 waits while the zoom-up switch SW14 is closed, and, after said switch is turned off, the sequence returns to the step S211, thus entering the loop of the steps S211, S212, S213, S214 and S215 again.

On the other hand, if the step S212 identifies that the zoom-down switch SW15 is closed, the sequence proceeds to a step S260. Said step S260 also reads the current focal length through the focal length detecting circuit 56, and sets the destination of the lens 63. In this case the destination of the lens 63 is 74 mm if the current focal length is equal to or smaller than 80 mm but larger than 74 mm. Likewise the destination is 71, 60 or 35 mm respectively if the current focal length is equal to or smaller than 74 mm but larger than 71 mm, equal to or smaller than 71 mm but larger than 60 mm, or equal to or smaller than 60 mm but larger than 35 mm.

After the setting of the destination of the lens 63 in the step S260, a step S261 starts the zoom-down operation. Then a step S262 awaits the arrival of the lens 63 at the destination, and, upon arrival, a step S263 terminates the zoom-down operation. Then a step S264 waits while the zoom-down switch SW15 is closed, and after said switch is turned off, the sequence returns to the step S211 and repeats the loop of the steps S211, S212, S213, S214 and S215 until a next operation is entered.

On the other hand, if the step S213 identifies that the half-push switch SW11 is closed, the sequence proceeds to a step S271 for executing a photographing process. The photographing process steps S271 to S275 are identical with the steps S71 to S75 shown in FIG. 12 and will not, therefore, be explained further. Thereafter the sequence returns from the step S273 or S275 to the step S211, thus repeating the loop of the steps S211, S212, S213, S214 and S215. If the step zoom mode switch SW17, used for setting the step zoom mode in the step S214, is closed in the course of said loop, the sequence proceeds from the step S214 to a step S276 which erases the displays of all the focal lengths stored in the memory circuit 60 and the message of setting of the step zoom mode, leaving the display of current focal length of the lens 63, thereby terminating the step zoom mode.

The embodiments shown in FIGS. 9 to 17 enable rapid zooming, without losing the opportunity of exposure, Since plural focal lengths of the zoom lens are stored in advance in the memory circuit and the zoom lens can be zoomed to said focal lengths in succession with simple operations. Also the set focal lengths are retained even after the sequence zoom shooting mode or the step zoom mode is cancelled, so that the sequence zoom shooting operation or the step zoom operation can be conducted by thus retained focal lengths if said mode is set again. Also in repeated setting of said mode, the retained focal lengths are automatically displayed to facilitate confirmation.

What is claimed is:

1. A camera comprising:
   (a) a photographing lens with variable focal length;
   (b) first focal length varying signal generator means, for generating a first focal length varying signal continuously during a manual operation;
   (c) drive means for electrically driving said photographing lens to vary the focal length thereof during the generation of said first focal length varying signal;
   (d) current focal length signal generator means for generating a current focal length signal corresponding to the current focal length of said photographing lens;
   (e) memory instruction signal generator means for generating a memory instruction signal in response to a manual operation;
   (f) information memory means for storing information corresponding to said current focal length signal at the generation of said memory instruction signal;
   (g) second focal length varying signal generator means for generating a second focal length varying signal in response to a manual operation, wherein said drive means is adapted, in response to said second focal length varying signal, to electrically drive said photographing lens to a focal length corresponding to said information; and
   (h) manually operable means for determining whether or not said drive means is responsive to said second focal length varying signal, said information memory means retaining information stored therein even when said drive means is not responsive to said second focal length varying signal.

2. A camera according to claim 1, further comprising object distance signal generator means for generating an object distance signal corresponding to the object distance;
   wherein said information memory means comprises photographing magnification setting means for calculating photographing magnification based on said current focal length signal and said object distance signal at the generation of said memory instruction signal and storing said photographing magnification as said information; and
   said drive means is adapted to electrically vary the focal length of said photographing lens, based on said object distance signal and said information at the generation of said second focal length varying signal, thereby realizing said stored photographing magnification.

3. A camera according to claim 1, further comprising a photographing start member to be manually operated for starting a photographing operation, and a switch responding to manual operation of said photographing start member;
   wherein said switch controls said memory instruction signal generator means and is adapted to generate said memory instruction signal in response to manual operation of said photographing start member.

4. A camera according to claim 1, further comprising a photographing start member to be manually operated for starting a photographing operation, and a switch responding to manual operation of said photographing start member;
   wherein said switch controls said second focal length varying signal generator means and is adapted to generate said second focal length varying signal in response to manual operation of said photographing start member.

5. A camera according to claim 1, further comprising a photographing start member to be manually operated for starting a photographing operation, and a switch responding to manual operation of said photographing start member;
    wherein said memory instruction signal generator means is controlled by said switch to generate said memory instruction signal in response to manual operation of said photographing start member; and
    said second focal length varying signal generator means is controlled by said switch to generate said second focal length varying signal in response to manual operation again of said photographing-start member after the generation of said memory instruction signal.

6. A camera according to claim 1, wherein said manually operable means comprises a switch for permitting said drive means to respond to said second focal length varying signal when said manually operable means is operated once and for preventing said drive means from responding to said second focal length varying signal when said manually operable means is operated again.

7. A camera according to claim 1, further comprising a view finder capable of varying a finder image formed therein according to change in focal length of said photographing lens.

8. A camera according to claim 7, wherein said view finder is adapted to vary the image angle of the finder image formed therein, according to the change in focal length of said photographing lens.

9. A camera comprising:
    (a) a photographing lens with variable focal length;
    (b) first focal length varying signal generator means for generating a first focal length varying signal continuously during a manual operation;
    (c) drive means for electrically driving said photographing lens to vary the focal length thereof, during the generation of said first focal length varying signal;
    (d) a view finder capable of varying a finder image formed therein according to change in focal length of said photographing lens;
    (e) current focal length signal generator means for generating a current focal length signal corresponding to the current focal length of said photographing lens;
    (f) object distance signal generator means for generating an object distance signal corresponding to the object distance;
    (g) memory instruction signal generator means for generating a memory instruction signal in response to a manual operation;
    (h) information memory means for storing information based on said current focal length signal and said object distance signal at the generation of said memory instruction signal;
    (i) second focal length varying signal generator means for generating, in response to a manual operation, a second focal length varying signal, in response to which said drive means electrically drives said photographing lens to a focal length based on said object distance signal and said information at the generation of said second focal length varying signal, wherein said focal length based on said information is determined in such a manner that, if said object distance signal at the generation of said second focal length varying signal indicates a farther distance than said object distance signal at the generation of said memory instruction signal, there is selected a focal length, which is larger, corresponding to said farther distance, than the focal length indicated by said current focal length signal at the generation of said memory instruction signal, and, if said object distance signal at the generation of said second focal length varying signal indicates a closer distance than said object distance signal at the generation of said memory instruction signal, there is selected a focal length which is smaller, corresponding to said closer distance, than the focal length indicated by said current focal length signal at the generation of said memory instruction signal; and
    (j) a photographing start member to be manually operated for starting a photographing operation, wherein, in response to manual operation of said photographing start member, said memory instruction signal generator means is adapted to generate said memory instruction signal, and, said second focal length varying signal generator means is adapted to generate said second focal length varying signal in response to manual operation gain of said photographing start member after the generation of said memory instruction signal.

10. A camera comprising:
    (a) a photographing lens with variable focal length;
    (b) first focal length varying signal generator means for generating a first focal length varying signal continuously during a manual operation;
    (c) drive means for electrically driving said photographing lens to vary the focal length thereof during the generation of said first focal length varying signal;
    (d) current focal length signal generator means for generating a current focal length signal corresponding to the current focal length of said photographing lens;
    (e) memory instruction signal generator means for generating a memory instruction signal in response to a manual operation;
    (f) memory means for storing, in response to said memory instruction signal, said current focal length signal at the generation of said memory instruction signal, as a set focal length signal, wherein memorizing of current focal length is conducted for each generation of said memory instruction signal whereby said memory means stores set focal length signals of a number equal to the number of generations of said memory instruction signal;
    (g) second focal length varying signal generator means for generating a second focal length varying signal in response to a manual operation, wherein said drive means responds in succession, to one of said set focal length signals from said memory means at each generation of said second focal length varying signal and electrically drives said photographing lens to a focal length indicated by the thus read set focal length signal.

11. A camera according to claim 10, further comprising display means for displaying the focal length indicated by said current focal length signal.

12. A camera according to claim 10, further comprising display means for displaying the focal lengths indicated by said set focal length signals.

13. A camera according to claim 10, further comprising:

photographing start means to be manually operated for starting a photographing operation; and photographing means for continuing said photographing operation during the continuation of said manual operation of said photographing start means;

wherein said second focal length varying signal generator means is adapted to generate said second focal length varying signal in response to manual operation of said photographing start means; said drive means is adapted, in response to said second focal length varying signal, to respond to the first of said set focal length signals stored in said memory means and to electrically drive said photographing lens to a focal length indicated by said first set focal length signal; then said second focal length varying signal generator means generates said second focal length varying signal repetitively during the continuation of manual operation of said photographing start means; and said drive means responds to the second and subsequent set focal length signals from said memory means in succession and electrically drives said photographing lens to corresponding focal lengths.

14. A camera according to claim 10, wherein said memory means is adapted to store said plural set focal length signals after sorting.

15. A camera according to claim 10, further comprising focal length varying mode switch means for manually selecting either a first focal length varying signal responding state in which said drive means responds to said first focal length varying signal but does not respond to said second focal length varying signal, or a second focal length varying signal responding state in which said drive means responds to said second focal length varying signal but not to said first focal length varying signal.

16. A camera according to claim 15, wherein said first focal length varying signal generating means and said second focal length varying signal generator means are both controlled by the same manually operable means.

17. A camera according to claim 10, further comprising:

memory enabling switch means for manually selecting either a memory enabling state in which said memory means responds to said memory instruction signal, or a memory disabling state in which said memory means does not respond to said memory instruction signal; and photographing start signal generator means, comprising a switch for generating, in response to a manual operation, a photographing start signal for starting a photographing operation;

wherein said memory instruction signal generator means is controlled by said switch, which generates said memory instruction signal in said memory enabling state in response to manual operation of said photographing start signal generator means, or generates said photographing start signal in said memory disabling state in response to manual operation of said photographing start signal generator means.

18. A camera comprising:
(a) a photographing lens with variable focal length;
(b) first focal length varying signal generator means for continuously generating a first focal length varying signal for varying a focal length of said photographing lens during a manual operation;
(c) drive means for electrically driving said photographing means on the basis of said first focal length varying signal to vary the focal length thereof;
(d) a view finder capable of varying a finder image formed therein according to change in focal length of said photographing lens;
(e) memory instruction signal generator means for generating a memory instruction signal in response to a manual operation;
(f) current focal length signal generator means for generating a current focal length signal corresponding to the current focal length of said photographing lens;
(g) object distance signal generator means for generating an object distance signal corresponding to the object distance;
(h) information memory means for storing information based on said current focal length signal and said object distance signal at the generation of said memory instruction signal;
(i) second focal length varying signal generator means for generating a second focal length varying signal based on said object distance signal and said information after said information is stored, said drive means electrically driving said photographing lens to a focal length based on said second focal length varying signal in response to the generation thereof, wherein said focal length based on said information is determined in such a manner that, if said object distance signal at the generation of said second focal length varying signal indicates a farther distance than said object distance signal at the generation of said memory instruction signal means, there is selected a focal length, which is larger, corresponding to said farther distance, then the focal length indicated by said current focal length signal at the generation of said memory instruction signal, and if said object distance signal at the generation of said second focal length varying signal indicates a closer distance than said object distance signal at the generation of said memory instruction signal means, there is selected a focal length, which is smaller, corresponding to said closer distance, than the focal length indicated by said current focal length signal at the generation of said memory instruction signal; and
(h) indicating means for indicating that said information is stored.

19. A camera according to claim 18, wherein said indicating means is deenergized when said information is not stored.

20. A camera according to claim 18, wherein said information stored into said information memory means is maintained to a time when a constant photographing magnification mode is switched to a normal photographing mode.

21. A camera comprising:
(a) a photographing lens with variable focal length;
(b) first focal length varying signal generator means for continuously generating a first focal length varying signal for varying a focal length of said photographing lens during a manual operation;
(c) drive means for electrically driving said photographing means on the basis of said first focal length varying signal to vary the focal length thereof;

(d) a view finder capable of varying a finder image formed therein according to change in focal length of said photographing lens;
(e) memory instruction signal generator means for generating a memory instruction signal;
(f) information memory means for storing information relating to a photographing ratio at the generation of said memory instruction signal;
(g) second focal length varying signal generator means for generating a second focal length varying signal based on said information after storing said information, said drive means electrically driving said photographing lens to a focal length based on said second focal length varying signal in response to the generation thereof, wherein said focal length based on said information is determined in such a manner that, if said object distance signal at the generation of said second focal length varying signal indicates a farther distance than said object distance signal at the generation of said memory instruction signal means, there is selected a focal length, which is larger, corresponding to said farther distance, than the focal length indicated by said current focal length signal at the generation of said memory instruction signal, and if said object distance signal at the generation of said second focal length varying signal indicates a closer distance than said object distance signal at the generation of said memory instruction signal means, there is selected a focal length, which is smaller, corresponding to said closer distance, than the focal length indicated by said current focal length signal at the generation of said memory instruction signal; and
(h) indicating means for indicating that said information is stored.

22. A camera according to claim 21,
wherein said memory instruction signal generator means generates said memory instruction signal in response to a manual operation.

23. A camera comprising:
(a) a photographing lens with variable focal length;
(b) first focal length varying signal generator means for continuously generating a first focal length varying signal for varying a focal length of said photographing lens during a manual operation;
(c) drive means for electrically driving said photographing means on the basis of said first focal length varying signal to vary the focal length thereof;
(d) memory instruction signal generator means for generating a memory instruction signal;
(e) information memory means for storing information relation to a photographing ratio at the generation of said memory instruction signal;
(f) second focal length varying signal generator means for generating a second focal length varying signal based on said information after storing said information, said drive means electrically driving said photographing lens to a focal length based on said second focal length varying signal in response to the generation thereof, wherein said focal length based on said information is determined in such a manner that, if said object distance signal at the generation of said second focal length varying signal indicates a farther distance than said object distance signal at the generation of said memory instruction signal means, there is selected a focal length, which is larger, corresponding to said farther distance, than the focal length indicated by said current focal length signal at the generation of said memory instruction signal, and if said object distance signal at the generation of said second focal length varying signal indicates a closer distance than said object distance signal at the generation of said memory instruction signal means, there is elected a focal length, which is smaller, corresponding to said closer distance, than the focal length indicated by said current focal length signal at the generation of said memory instruction signal; and
(g) zoom mode switching signal generator means for generating a zoom mode switching signal switching from a manual zoom mode in which a focal length varies on the basis of said first focal length varying signal to an auto zoom mode in which a focal length varies on the basis of said second focal length varying signal, or vice versa, and
(h) inhibiting means for inhibiting an operation of said drive means in response to said second focal length varying signal during said manual zoom mode,
wherein said information memory means maintains information relating to a photographing ratio during said manual zoom mode, and thereafter said second focal length varying signal generator means generates a second focal length varying signal based on said information stored in said information memory means, when said zoom mode switching signal generator means switches to said auto zoom mode.

24. A camera according to claim 23 further comprising:
a photographing start member to be manually operated for starting a photographing operation,
wherein said second focal length varying signal generator means is controlled by a switch responsive to a manual operation of said photographing start member, to generate said second focal length varying signal.

25. A camera according to claim 23,
wherein said memory instruction signal generator means generates said memory instruction signal in response to a manual operation.

* * * * *